US011403809B2

(12) United States Patent
Duan et al.

(10) Patent No.: US 11,403,809 B2
(45) Date of Patent: Aug. 2, 2022

(54) SYSTEM AND METHOD FOR IMAGE RENDERING

(71) Applicant: SHANGHAI UNITED IMAGING HEALTHCARE CO., LTD., Shanghai (CN)

(72) Inventors: Qi Duan, Shanghai (CN); Chao Fu, Shanghai (CN); Da Wu, Shanghai (CN); Wenqing Liu, Shanghai (CN); Liangliang Pan, Shanghai (CN); Weidong Zhang, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 0 days.

(21) Appl. No.: 16/908,699

(22) Filed: Jun. 22, 2020

(65) Prior Publication Data
US 2020/0320778 A1 Oct. 8, 2020

Related U.S. Application Data

(63) Continuation-in-part of application No. 15/023,696, filed as application No. PCT/CN2015/083897 on Jul. 13, 2015, now Pat. No. 10,692,272.

(30) Foreign Application Priority Data

Jul. 11, 2014 (CN) .......................... 201410331198.1
Oct. 31, 2014 (CN) .......................... 201410606287.2
Dec. 5, 2014 (CN) .......................... 201410737649.1

(51) Int. Cl.
*G06T 15/30* (2011.01)
*G06T 7/11* (2017.01)
*G06T 15/08* (2011.01)

(52) U.S. Cl.
CPC ................ *G06T 15/30* (2013.01); *G06T 7/11* (2017.01); *G06T 15/08* (2013.01)

(58) Field of Classification Search
None
See application file for complete search history.

(56) References Cited

U.S. PATENT DOCUMENTS 6,437,782 B1 8/2002 Pieragostini et al.
2005/0017972 A1 1/2005 Poole et al.
(Continued)

FOREIGN PATENT DOCUMENTS

CN 1877637 A 12/2006
CN 101593345 A 12/2009
(Continued)

OTHER PUBLICATIONS

Autodesk, "Advanced Render Settings Palette", published Jul. 8, 2014, retrieved from https://knowledge.autodesk.com/support/autocad/learn-explore/caas/CloudHelp/cloudhelp/2015/ENU/AutoCAD-Core/files/GUID-F8A234CB-5742-4660-AC41-09287EC5161B-htm.html on Jul. 30, 2021.*

(Continued)

*Primary Examiner* — Yingchun He
(74) *Attorney, Agent, or Firm* — Metis IP LLC

(57) ABSTRACT

The present invention relates to a system and method for image processing. An image data processing system is disclosed comprising an image cutting engine for image cutting based on image data; a region of interest processing engine for selecting at least a rendering method for a region of interest; a processing engine for adjusting sampling rate; and rendering engine for rendering the image, with the rendering method selected by the region of interest processing engine. More particularly, the present invention relates to image processing techniques that perform image manipu- (Continued)

lation, volume rendering, displaying targeted regions of interest and other related functions.

19 Claims, 26 Drawing Sheets

(56) References Cited

U.S. PATENT DOCUMENTS

| | | | |
|---|---|---|---|
| 2006/0280351 | A1 | 12/2006 | Luping et al. |
| 2007/0183649 | A1 | 8/2007 | Kiefer et al. |
| 2008/0118148 | A1 | 5/2008 | Jiao et al. |
| 2009/0217187 | A1 | 8/2009 | Kendall et al. |
| 2009/0244065 | A1 | 10/2009 | Storti et al. |
| 2010/0001999 | A1 | 1/2010 | Everitt et al. |
| 2010/0041992 | A1 | 2/2010 | Ohuchi et al. |
| 2011/0075885 | A1 | 3/2011 | Yuan |
| 2011/0141112 | A1 | 6/2011 | Hux et al. |
| 2011/0267363 | A1 | 11/2011 | Miller et al. |
| 2011/0282207 | A1 | 11/2011 | Hashimoto |
| 2012/0280684 | A1 | 11/2012 | Kim et al. |
| 2013/0338501 | A1 | 12/2013 | Clingman |

FOREIGN PATENT DOCUMENTS

| | | |
|---|---|---|
| CN | 101770650 A | 7/2010 |
| CN | 101877141 A | 11/2010 |
| CN | 102013113 A | 4/2011 |
| CN | 102708585 A | 10/2012 |
| CN | 102722885 A | 10/2012 |
| CN | 103236058 A | 8/2013 |
| CN | 103810742 A | 5/2014 |
| CN | 104166958 A | 11/2014 |
| CN | 104463941 A | 3/2015 |
| CN | 104463942 A | 3/2015 |
| EP | 2196958 A2 | 6/2010 |
| WO | 2004109600 A1 | 12/2004 |

OTHER PUBLICATIONS

McReynolds et al., "Programming with OpenGL: Advanced Rendering", published 1997, Chapter 14.*
Khamfongkhruea et al., "Comparison of CT images with average intensity projection, free breathing, and mid-ventilation for dose calculation in lung cancer", J Appl Clin Med Phys 2017 18:2:26-36 (Year: 2017).*
Bell et al. Multiplanar reformation (MPR), https:radiopaedia.org/articles/multiplanar-reformation-mp, 2020 (Year: 2020).*
DICOM Standards Committee, "Digital Imaging and Communications in Medicine (DICOM) Supplement 156: Planar MPR Volumetric Presentation State", 2014 (Year: 2014).*
Preim et al., "Shaded Surface", Visual Computing for Medicine (Second Edition), 2014 (Year: 2014).*
Ghafurian et al., "Fast generation of digitally reconstructed radiograph through an efficient preprocessing of ray attenuation values", SPIE Medical Imaging, 2016 (Year: 2016).*
Fu, Chao et al., Research on the Optimization Method of 3D Human Body Models in eMTM System, Microcomputer Applications, 2019, 5 pages.
Zhou, Jianlong et al., Focal Region Based vol. Rendering by Texture Mapping and GPU Based Approach, Journal of Computer-Aided Design &Computer Graphics, 20(1): 32-37, 2008.
ULF Assarsson et al., Optimized View Frustum Culling Algorithms, Chalmers University of Technology, 1999, 29 pages.
Tim Weingartner et al., Split-and-Merge Segmentation Using Octrees, In ACCV '95 Second Asian Conference on Computer Vision, 1995, 5 pages.
Paul Bourke, Frustum Culling, 2000, 3 pages.
James H. Clark, Hierarchical Geometric Models for Visible Surface Algorithms, Communications of the ACM 19, 1976, 8 pages.
Johanna Beyer et al., State-of-the-Art in GPU-Based Large-Scale Volume Visualization, Computer Graphics Forum, 2015, 25 pages.
Fredrik Lundell, Out-of-Core Multi-Resolution Volume Rendering of Large Data Sets, 2011, 65 pages.
International Search Report in PCT/CN2015/083897 dated Oct. 13, 2015, 4 pages.
Written Opinion in PCT/CN2015/083897 dated Oct. 13, 2015, 5 pages.
First Office Action in Chinese Application No. 201410606287.2 dated Dec. 10, 2016, 10 pages.
First Office Action in Chinese Application No. 201410737649.1 dated Dec. 1, 2016, 17 pages.
First Office Action in Chinese Application No. 201410331198.1 dated Dec. 3, 2016, 14 pages.
The Second Office Action in Chinese Application No. 201410331198.1 dated Mar. 20, 2017, 24 pages.
The Third Office Action in Chinese Application No. 201410331198.1 dated Jul. 19, 2017, 20 pages.
The Extended European Search Report in European Application No. 15819334.2 dated Jan. 11, 2018, 9 pages.

* cited by examiner

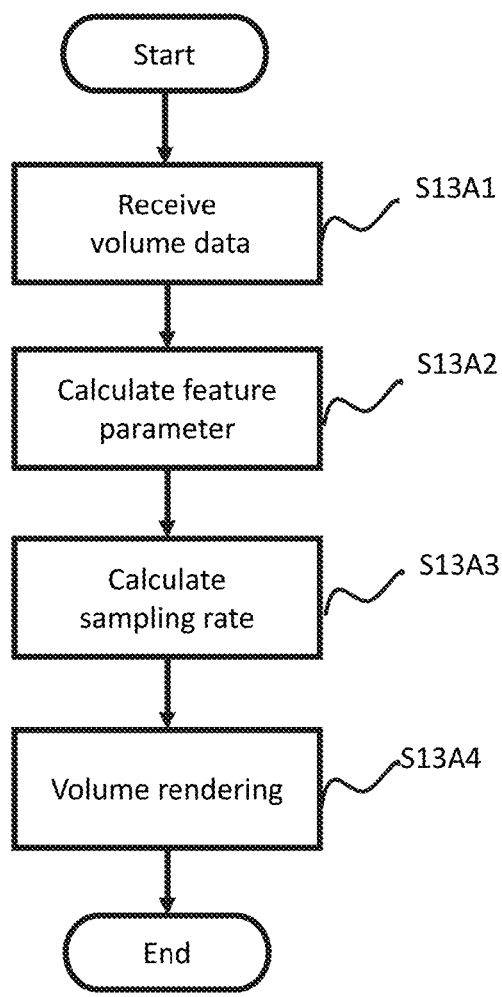
FIG. 13-A
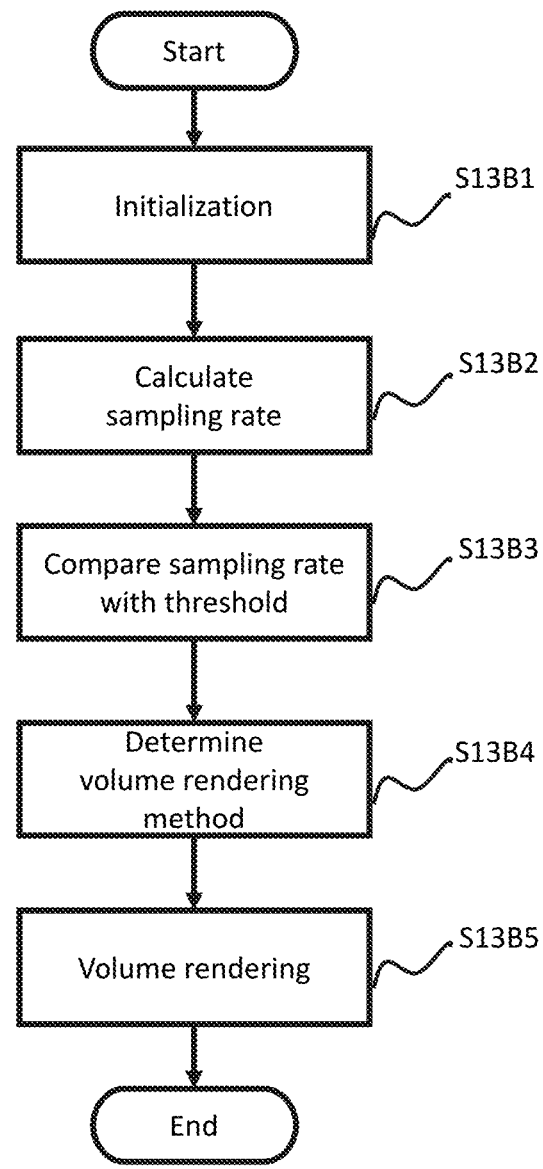
FIG. 13-B

SYSTEM AND METHOD FOR IMAGE RENDERING

CROSS-REFERENCE TO RELATED APPLICATIONS

This application is a continuation in part application of U.S. patent application Ser. No. 15/023,696, filed on Mar. 22, 2016, which is a U.S. national phase entry of International Application No. PCT/CN2015/083897 filed on Jul. 13, 2015, designating the United States and published in English on Jan. 14, 2016, which in turn claims priority of Chinese Application No. 201410331198.1 field on Jul. 11, 2014, Chinese Application No. 201410606287.2 field on Oct. 31, 2014, and Chinese Application No. 201410737649.1 field on Dec. 5, 2014, the entire contents of each of which are incorporated herein by reference.

TECHNICAL FIELD

The present invention relates to a system and method for image processing. More particularly, the present invention relates to image processing techniques that perform image manipulation, volume rendering, displaying targeted regions of interest and other related functions.

BACKGROUND

Early in the 1980s visualization of 3-D images became the focus of image processing. Volume rendering is a technique developed for visualizing the interior of a solid region represented by a 3-D image using a 2-D projection plane. It plays a key role in many important fields, such as medical imaging processing and computer graphics. However, there are several technical challenges that need to be overcome when applying volume rendering technique to medical images. For example, the volume rendering may need to process 3-D data within the region. As image resolution grows, the amount of data to be processed may also increase significantly, which makes the real-time production of high quality images a formidable task. Different techniques of volume rendering may be required for different regions of 3-D volume data, in order to highlight the regions of interest to the observers. Sometimes the regions of less interest may need to be removed. For example, a doctor may want to remove the skull part from a medical image in order to reveal the blood vessels within a patient's brain. Therefore, there is a need to improve image processing techniques that facilitate visualization of 3-D images and processing of medical imaging.

SUMMARY

It is an object of the present disclosure to provide an image processing system, an image processing device, and image processing methods.

It is also an object of the present disclosure to provide an image processing apparatus which performs various functions on an image, such as image partitioning, image translating, rendering regions of interest, the like, or any combination of thereof.

It is further an object of the present disclosure to provide a system and method for concealing parts of image, either two-dimensional or three-dimensional, in order to see more clearly the region of interest.

It is a further object of the present disclosure to provide an improved system and method which can use different rendering methods for rendering regions of interest, selected by the user or the system.

It is a further object of the present disclosure to provide a system and method for rendering images based on sampling rate, so that an improved display quality of the image may be achieved during the interactive process with users.

Yet another object of the present disclosure is to provide an image acquisition apparatus for capturing or obtaining the image data, wherein the image acquisition apparatus may be a medical image processing apparatus. The medical image processing apparatus may include an X-ray device, X-ray Computed Tomography scanner, Single Photon Emission Computed Tomography scanner, Position Emission Tomography facility, ultrasonic equipment, Magnetic Resonance Imaging (MRI) scanner, B-Scan Ultrasound facility, the like, or any combination thereof.

Additional objects and advantages of the disclosure will be set forth in part by the description which follows, and manifest from the description, or may be learned by practice of the described disclosure. The objects and advantages of the disclosure will be realized and attained by means of the elements and combinations particularly pointed out in the appended claims.

BRIEF DESCRIPTION OF THE DRAWINGS

The accompanying drawings, which are incorporated in and constitute a part of this specification, illustrate several aspects described below.

FIG. 13-A and FIG. 13-B are flowchart diagrams of performing different volume rendering methods based on different sampling rates;

DETAILED DESCRIPTION

After reading this description, it will become apparent to one skilled in the art how to implement the disclosure in various alternative embodiments and alternative applications. However, not all embodiments of the present disclosure are specifically described herein. It will be understood that the embodiments are presented by way of example only, and not limitation. As such, this detailed description of various alternative embodiments should not be construed to limit the scope or breadth of the present invention as set forth below.

Before the present invention is disclosed and described, it is to be understood that the aspects described below are not limited to specific systems, methods of making such systems or uses thereof as such may of course vary. It is also to be understood that the terminology used herein is for the purpose of describing particular aspects only and is not intended to be limiting.

According to the specifications and claims in the present application, unless otherwise specified in the content, articles such as "a", "an", and/or "the" do not necessarily indicate single forms, and also include plural forms. Generally, expressions such as "include" or "comprise" are only used to indicate numbered steps or elements. However, listing of these steps and elements is not exclusive, and methods or devices may include other steps or elements.

The present disclosure may be applied to many areas, e.g., non-destructive evaluation, remote sensing, defense surveillance and medical image processing. Merely by way of example, the present disclosure may relate to a system and method of medical image processing. Medical image processing may involve a nuclear medical imaging system and method. The method for image processing may involve volume rendering techniques. The system and method involve improved module design and image processing. In some embodiment, the system and method as disclosed herein may allow the medical image to be manipulated in an interactive way. Some regions of the image may be cut, so that the region of interest in the image can be exhibited more clearly. In some embodiments, the image may be rotated, split, enlarged, shrunk, translated, and/or combined in accordance with the requirement of the user. Various parts of the image may be treated using different volume rendering methods on-the-fly. The following description is provided with reference to volume rendering in connection with the medical imaging processing for illustration purposes, and is not intended to limit the scope of the present disclosure.

Figure 1:
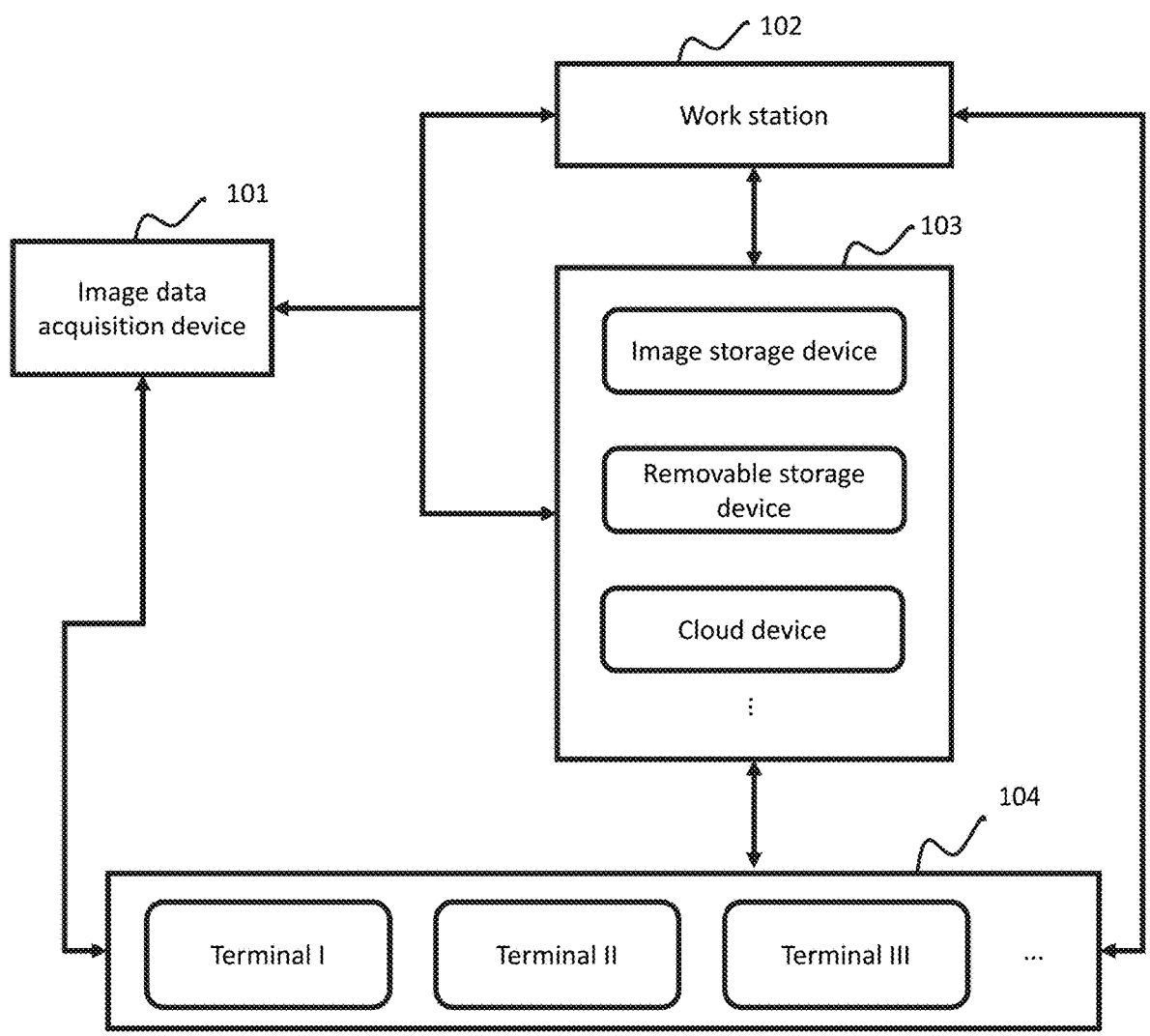
FIG. 1 illustrates an exemplary system in accordance with some embodiments of the present disclosure.

FIG. 1 illustrates an exemplary system in accordance with some embodiments of the present disclosure. The image processing system may include one or more of image data acquisition device 101, one or more of work station 102, one or more storage devices 103, and one or more terminals 104.

The image data acquisition device 101 may be configured as an information receiving point capable of acquiring image data, related command information, non-conditional information such as environmental data, the like, or any combination thereof. Image data may be, for example, any volume data, voxel data, or pixel data, or any combination thereof, either generated internally or received from storage device 103. Related command information such as operation and control information are typically generated from users, while adaptive control information can be generated elsewhere in the image processing system. Non-conditional information such as environmental data may come from external data sources.

The image data acquisition device 101 may include, but is not limited to, medical imaging equipment, photo equipment, and/or monitoring equipment. Medical imaging equipment may include, but is not limited to, nuclear medicine imaging equipment, magnetic resonance (MR) imaging equipment, ultrasound imaging equipment, thermal imaging equipment, or optical imaging equipment, the like, or any combination thereof. More particularly, medical imaging equipment may include, but not limited to, X-ray computed tomography (CT) scanner, single photon emission computed tomography (SPECT) scanner, positron emission tomography (PET) facility, angiography machine, B-scan ultrasonography facility, the like, or any combination thereof. Photo equipment may include, but not limited to, laser scanning confocal microscope (LSCM), 3-D laser scanner, 3-D headset viewer, the like, or any combination thereof. Monitoring equipment may include, but is not limited to, weather monitoring devices, environment monitoring devices, geology monitoring device, total station device, the like, or any combination thereof. As can be appreciated by one of ordinary skill in the art, other acquisition means may also fall within the metes and bounds of the claims, and include, but are not limited to, 3-D holographic projection, portable devices (e.g., handheld body scanner, 3D glasses, and portable medical equipment), the like, or any combination thereof.

The work station 102 may be any kind of equipment which can perform data processing. For example, it may be a high-performance computer specialized in image processing or transaction processing, a personal computer, a portable device, server or microprocessor, integrated chip, digital signal processor (DSP), pad, PDA, tablet the like, or any combination thereof. The work station 102 may be configured for analyzing data or information acquired from image data acquisition device 101, storage device 103, and/or terminal 104. The work station 102 may be connected by wire or wirelessly to the image data acquisition device 101, storage device 103, terminal 104, or a combination thereof.

The description of the work station 102 is intended to be illustrative, and not to limit the scope of the present disclosure. Many alternatives, modifications, and variations will be apparent to those ordinarily skilled in the art. For example, the work station 102 may be integrated with image data acquisition device 101, storage device 103, terminal 104, or a combination thereof. The image data acquisition device 101, storage device 103, terminal 104 or their combination could perform some functions of work station 102. Similar modifications should fall within the metes and bounds of the claims.

The storage device 103 may be configured to store all or part of the data received from image data acquisition device 101, processed and/or analyzed results received from work station 102, information received from terminal 104, the like, or any combination thereof. The storage device 103 may be an external or internal device, or peripherals. The storage device 103 and other devices may be connected by wire or wirelessly.

The storage device 103 may be an image storage device, a conventional storage device, a removable mass storage device, cloud storage device, the like, or any combination thereof. The image storage device may include a database of a picture archiving and communication system (PACS), database of personal information of users, database for storing image classification information, the like, or any combination thereof. The conventional storage device may include hard drives, flash drives, tapes, CD-ROMs, the like, or any combination thereof. The removable mass storage device may include removable hard drives, floppy disk, CD-ROMs, DVD, Blu-ray Disc, the like, or any combination thereof. The cloud storage device may either be built into the image processing system, or located in any third party commercial server offering cloud storing service.

The terminal 104 may be configured to access the image data acquisition device 101, the work station 102, the storage device 103, or a combination thereof. The terminal 104 may be operated by users or work autonomously. The terminal 104 may be personal computer, table computer, personal digital assistant, somatosensory device, mobile phone, the like, or any combination thereof. The terminal 104 may also be connected with one or more external devices. The external devices may include mouse, keyboard, remote-control unit, sensors, the like, or any combination thereof.

The connection used between image data acquisition device 101, work station 102, storage device 103 and terminal 104 may be by wire or wireless. Cables used for connections by wire may include, but are not limited to, metal cables, optical cables, and hybrid cables (examples include: coaxial cables, communications cables, flexible cables, heliax cables, non-metallic sheathed cables, metallic sheathed cables, multi-core cables, paired cables, ribbon cables, shielded cables, single cables, twin ax cables, twin-lead cables, and twisted pair cables). The above mentioned examples are only for illustrative purpose, the medium of wired connection may be in other types, such as other medium for transferring electric signals or optical signals. Wireless connections may include, without limitations to, radio communication, free-space optical communication, sonic communication, and electromagnetic induction communication. More specifically, radio communication may include, without limitations to, IEEE802.11 series standards, IEEE802.15 series standards (e.g., Bluetooth and ZigBee technology), first generation mobile communication technology, second generation mobile communication technology (e.g., FDMA, TDMA, SDMA, CDMA, and SSMA), general packet radio service, third generation mobile communication technology (e.g., CDMA2000, WCDMA, TS-SDMA and WiMAXs), fourth generation mobile communication technology (e.g., TD-LTE and FDD-LTE), satellite communication (e.g., GPS), and other technology that operates on ISM frequencies (e.g., 2.4 GHz). Free-space optical communication may include, without limitations to, visible lights, and infrared signals. Sonic communication may include, without limitation to, sound wave, and supersonic wave. Electromagnetic induction may include, without limitation to, near field communication technology. The above mentioned examples are only for illustrative purpose, and wireless connections may also be in other types, such as Z-wave technology, Bluetooth low energy (BLE) technology, 433 MHz communication protocol frequencies, other charged civil radio frequencies and military radio frequencies.

The above description is intended to be illustrative, and not to limit the scope of the claims. Many alternatives, modifications, and variations will be apparent to those ordinarily skilled in the art. For example, part or all of the information acquired by image data acquisition device 101 may be processed by terminal 104. In some embodiments, the image data acquisition device 101 may pre-process the image data, before the image data is sent to the work station 102 for further processing. In some embodiments, the image data acquisition device 101 may be combined with work station 102 as single device. Similar modifications should fall within the metes and bounds of the claims.

Figure 2:
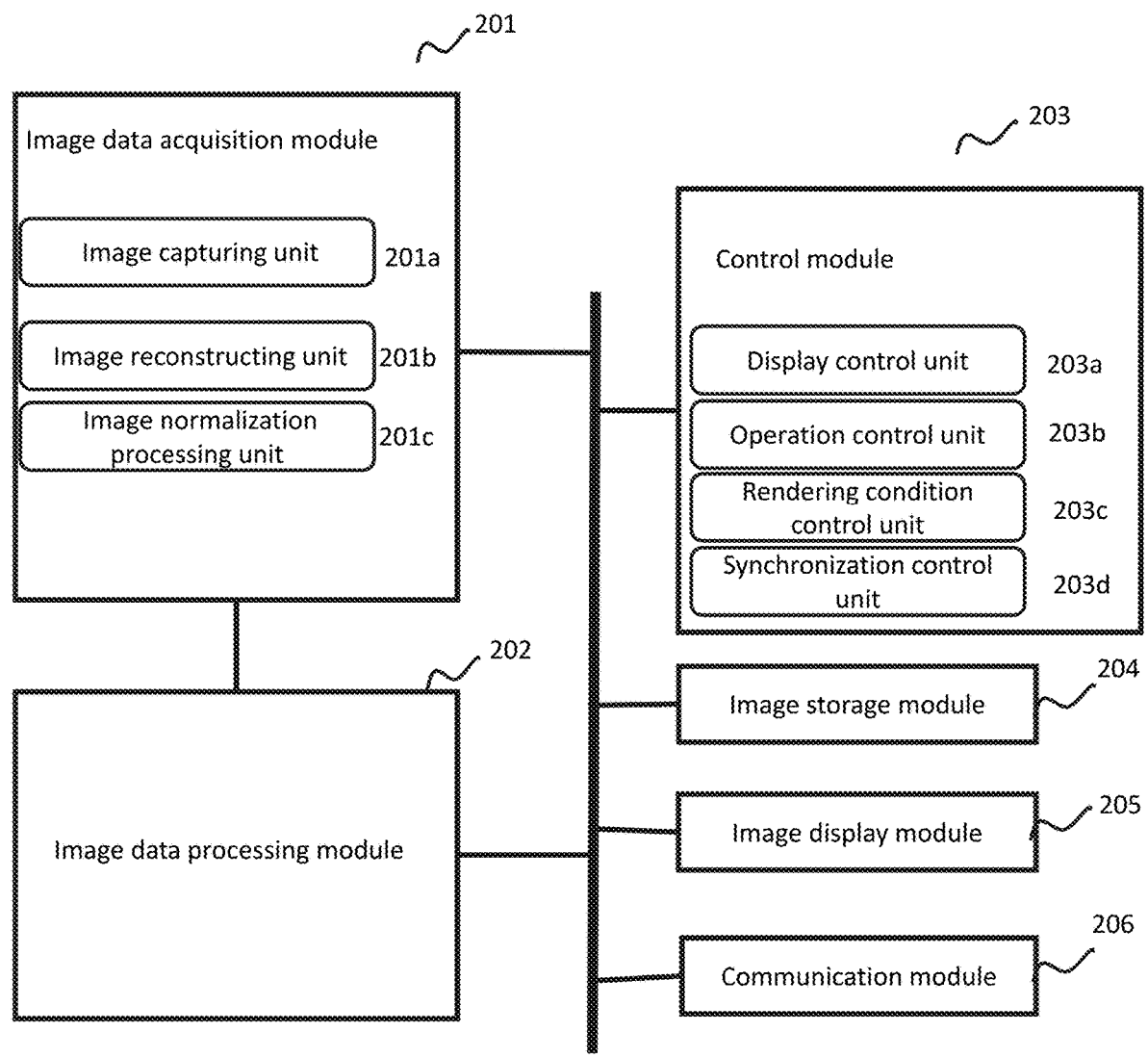
FIG. 2 is an illustration of the image processing system in FIG. 1.

FIG. 2 is functional illustration of the image processing system in FIG. 1. The system may be configured to process a medical image automatically or according to the operation of users. The system may include an image data acquisition module 201, an image data processing module 202, a control module 203, an image storage module 204, an image display module 205, and a communication module 206. Various components of the system may be connected to each other directly or indirectly via a network.

The image data acquisition module 201 may be configured for acquiring image data related to one or more subjects. The image data may either be shot using the image data acquisition device, or from the image storage module 204. The image data acquisition module 201 may include an image capturing unit 201a, an image reconstructing unit 201b, and/or an image normalization processing unit 201c. The image capturing unit 201a may be configured to take images of the subject. Furthermore, the image capturing unit 201a may be connected to, for example, a gantry of an MRI apparatus or an X-ray CT apparatus, the like, or any combination thereof. In some embodiments, the image capturing unit 201a may also be configured to acquire image signals and/or image data, such as MR signals or X-ray projection data, via for example image storage module 204.

The image reconstructing unit 201b may be configured to reconstruct images from the data acquired by the image capturing unit 201a. Merely by way of example, the image reconstructing unit 201b reconstructs a plurality of axial slices of a subject based on the data acquired by the image capturing unit 201a. In another example, the image reconstructing unit 201b reconstructs 3-D voxels from a plurality of 2-D X-ray projection data acquired by the image capturing unit 201a. As a result of such reconstructing processes, the image reconstructing unit 201b generates three-dimensional image data such as volume data.

The image normalization processing unit 201c may perform a normalization process on the images reconstructed by the image reconstructing unit 201b. Merely by way of example, MRI scans are often carried out on various scanners and at many different sites, and the quality of these images is highly dependent on the imaging parameters and the calibration of the scanners. Intensity normalization or standardization is thus an important preprocessing step in MRI analysis. In some embodiments, the medical image data needs to satisfy a storing condition. If the image to be stored satisfies the storing condition, the image normalization processing unit 201c may perform the normalization process.

The image data processing module 202 may be configured for processing image data. The image data processing module 202 may be connected to or otherwise communicate with one or more image data acquisition modules 201-1, 201-2, . . . , 201-N or one or more image storage modules 204-1, 204-2, . . . , 204-N, to receive at least part of the acquired information. The image data processing module 202 may be connected to or otherwise communicate with one or more control modules 203 to receive one or more sets of control information.

The image data processing module 202 may be configured to perform one or more operations on the image, including, e.g., pre-processing, cutting, making mosaic, rendering, zooming, rotating, the like, or any combination thereof. Merely by way of example, some regions of the image may be cut by the image data processing module 202, so that the region of interest in the image can be exhibited more clearly. In some embodiments, the image may be rotated, split, enlarged, shrunk, translated, and/or combined in accordance with the requirement of the user. Various parts of the image may be treated using different volume rendering methods on-the-fly. For instance, the image data processing module 202 may adjust in a real-time way the sampling rate for a region of interest, so that the region of interest may be exhibited more quickly.

Control module 203 may be configured to provide control information. The control module 203 may include a display control unit 203a, an operation control unit 203b, a rendering control unit 203c, a synchronization control unit 203d, the like, or any combination thereof. The display control unit 203a may be operable to control the display of image. For example, whether the image needs to appear on the display, sub-screen display, competing display, or like, or a combination thereof. The operation control unit 203b may be configured to control the process of treating image, for example, cutting, making mosaic, changing parameters, rotating, contrasting, analyzing, the like, or any combination thereof. The rendering control unit 203c may be configured to control the process of rendering an image. The synchronization control unit 203d may be configured to synchronize various events during a rendering process, such as when rendering images using various rendering methods or displaying image using various display modes. The above mentioned units of the control module 203 are provided for illustration purposes, and not intended to limit the scope of the present disclosure. Many alternatives, modifications, and variations will be apparent to those ordinarily skilled in the art. For example, the render control unit and the operation control unit may be integrated as one unit. As another example, the control information may also include storage control information for controlling when/where to store image data.

Image display module 205 is configured for providing a displayed image. The information for display may be the image data acquired by the image data acquiring module 201, the reconstructed image data, the normalized image data, the stored image data in the image storage module 204, the processed image data by the image data processing module 202, the information of the control module 203, the like, or any combination thereof. The image display module 205 may be used to input control information to the control module 203. The image display module 205 may further be configured as an interactive interface with another device or users. The image display module 205 may be CRT (Cathode Ray Tube) displayer, LCD (Liquid Crystal display), LED (Light Emitting Diode) panel, three-dimensional displayer, PDP (Plasma Display Panel), the like, or any combination thereof. Furthermore, the image display module 205 may be in an external device, such as computer, tablet personal computer, PDA (Personal Digital Assistant), somatosensory device, mobile phone, the like, or any combination thereof. Besides, the image display module 205 may be touch panel, such as resistive touchscreen, capacitive touchscreen, infrared touchscreen, SAW (Surface Acoustic Wave) touchscreen, the like, or any combination thereof.

The communication module 206 may be configured to communicate between various modules of the image processing system, or between the image processing system and the external devices. The communication module 206 may be NIC (Network Interface Card), API (Application Programming Interface), bus, circuit, program, the like, or any combination thereof. The various modules may be configured to process image data in unison. For example, the communication module 206 may transfer the display information such as sub-screen to the image data processing module 202 and the image display module 205 to process and display the image data.

The description of the illustration is intended to be illustrative, and not to limit the scope of the present disclosure. Many alternatives, modifications, and variations will be apparent to those ordinarily skilled in the art. The features, structures, methods, and other characteristics of the exemplary embodiments described herein may be combined in various ways to obtain additional and/or alternative exemplary embodiments. For example, the image processing system may not include the communication module 206, the communication may be implement via the method such as the program calls, wireless, wire, the like, or any combination thereof. As another example, the control module 203 may be integrated with another module, an external system or distributed in at least two image processing systems.

Figure 3:
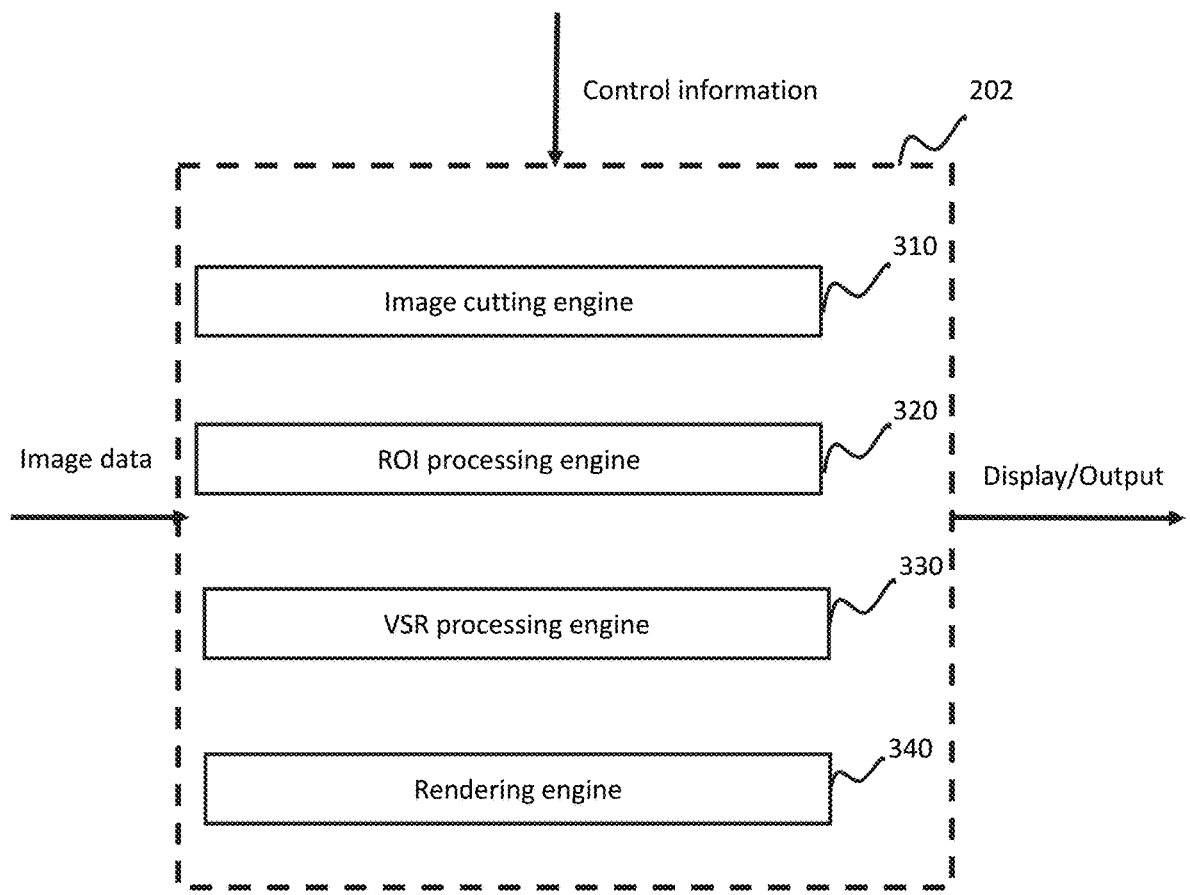
FIG. 3 is a block diagram illustrating an architecture of an image data processing module, according to some embodiments of the present disclosure.

FIG. 3 shows an exemplary diagram of the image data processing module 202. The image data processing module 202 transforms image data input to a display/output signal by way of a plurality of its data processing engines. The image data processing module 202 may be configured to receive control information along with the image data input whereupon processing of the received image data shall be based on and/or reflective of the received control information. The image data processing module 202 may include any combination of one or more from any selection of the following items: image cutting engine 310, ROI (Region of Interest)

processing engine 320, VSR (Variable Sampling Rate) processing engine 330, and rendering engine 340. An image cutting engine 310 is typically configured for cutting image data. Merely by way of example, cutting image data may include various steps to processing data related to an image of interest, for example, dividing the data, judging the positional relationships between a projection region and a region of interest, or marking the data. The ROI processing engine 320 is typically configured for rendering various regions of an image by at least one rendering method. The rendering methods used in different regions of an entire image may be the same or different. The rendering methods used in different regions of an image may be selected or set by the system or by the user. Exemplary rendering methods include, MIP (Maximum Intensity Projection) rendering, Minimum Intensity Projection rendering, Average rendering, Multi-Planner Reformation rendering, Shaded Surface rendering, Digital Reconstruction Radiography rendering, the like, or any combination thereof. Take, for example, an image that include various regions such as muscle, blood vessel, skin, cardiac, lung, or the like. A first region of the image may be processed by a first rendering method, e.g. MIP, while a second region of the same image may be processed by a second rendering method. It is allowable for the first and second rendering methods to be the same or different. The ROI processing engine 320 advantageously allows various regions of an image to be displayed contrastively. For example, contrastively displaying a cardiac region by red color, a lung region by green, and possibly other tissue by white. A VSR processing engine 330 may be configured to adjust the sampling rate of an image. Sampling rates of various regions within an image may be the same or different. For example, when perform a zooming operation, the sampling rate may be changed. A rendering engine such as one denoted by 340 may be configured for rendering an image, using parameters of selectable rendering method or sampling rate to process image data to a format suitable for rendering output.

Figure 4:
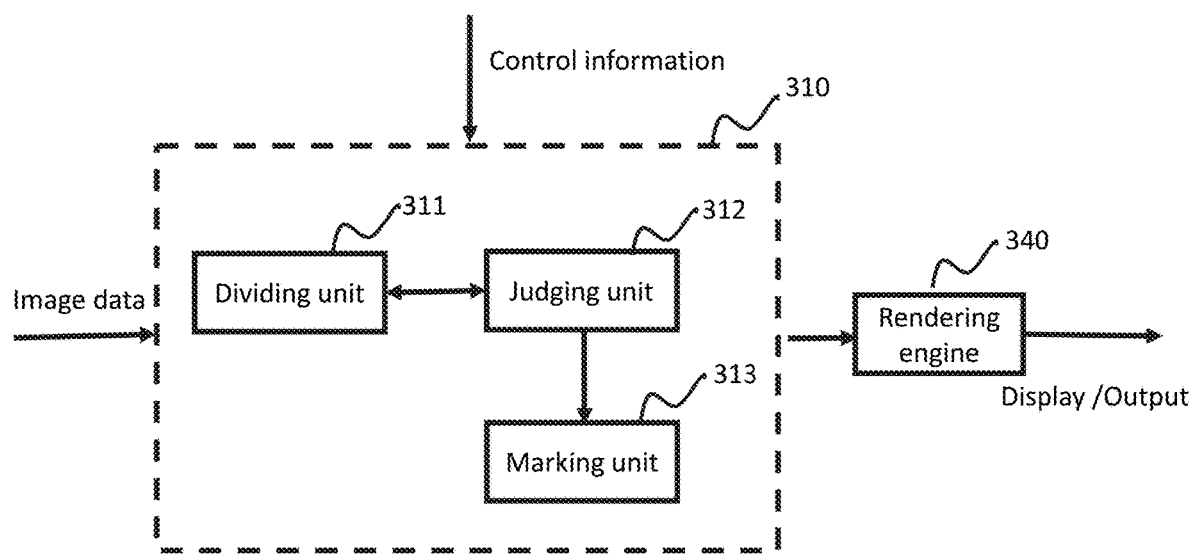
FIG. 4 is a block diagram illustrating an architecture of an image cutting engine, according to some embodiments of the present disclosure.

FIG. 4 is a block diagram illustrating one architecture of an image cutting engine, according an embodiment of the present invention. Image cutting engine 310 is configured for cutting an image reflective of control information input. The image cutting engine 310 may include any combination of one or more of any selection from the following items: the dividing unit 311, the judging unit 312, and the marking unit 313. As FIG. 4 depicts, the dividing unit 311 and the marking unit 313 may be connected with the judging unit 312. The image cutting engine 310 is configurable to receive image data and control information from other devices (not shown in FIG. 4), and perform image cutting operations to the image data according to the received control information. The image data may be any dimensional data such as 2-D data or higher, multi-dimensional data. Merely by way of example, the image data supposed is 3-D volume data. A dividing unit 311 may be configured to divide image data in space and form sub-data in some sub-space region. A judging unit 312 may be configured for comparing spatial relations between a cutting region and a projection region on a projection plane referencing any given viewpoint. For example, comparing if the projection region an image overlaps a selected cutting region. The marking unit 313 may be configured for performing the marking operation on image data.

By no means considered prerequisite, image cutting engine 310 may be configured to receive control information along with image data input. The control information may be from external devices. The image data is typically received by image cutting engine 310 through image acquisition device 101 or the image storage module 103. Typically, control information may include cutting region information. Cutting region information may be set or preset by the users, a program, a computer adaptive method, the like, or any combination thereof. The user may use a plurality of methods to set the cutting region information. For example, the user may set the cutting region through external devices. The image data may also be acquired from various methods. For example, the image data may be directly captured by the image data acquisition module 201. Alternately, image data may be loaded from image storage module 204. The image data may or may not be displayed on the projection plane. The image data processed by image cutting engine 310 may be configured to reflect the control information input any degree desirable. Exemplary operations of the processing performed by image cutting engine 310 may include space division, position judgment, data marking, the like, or any combination thereof. Resulting processing data or inter-data may be displayed, outputted, stored, or any combination thereof. For example, the result of image cutting engine 310 may be displayed as an image through rendering engine 340, stored by any means such as through image storage device 103 (not shown in FIG. 4), and/or output to other devices simultaneously. A display apparatus may incorporate technology based on CRT, LCD, LED, Plasma display, 3-D display, an image projection device, the like, or any combination thereof. Merely by way of example, display apparatus may be a computer display, mobile phone, tablet screen, head-mounted display, or virtual reality glasses.

Dividing unit 311 is configurable to divide image data within a space, and forming sub-data for that resulting sub-space. Merely by way of example, dividing unit 311 is configured to divide 3-D volume image data. As used herein, 3-D volume data may be a data with surface details in three dimensional space. The target image data for division may be original image data or sub-data of an original image data divided one or more times. The dividing process of dividing unit 311 may be based on the control information received by image cutting engine 310, the information from judging unit 312, or both. The dividing unit 311 may use a variety of methods to perform the operation of space division. The method may be a linear or nonlinear approach. The method may be based on preset data or a model. For example, the method may be based on a tree structure or other structure. The method used in the whole process, or in different stage of division may be different. Exemplary methods for space division may include Split and Merge Algorithm, Tree-based Split Algorithm, Adaptive-Bounding-Box Spilt Algorithm, Node-Merging Algorithm, k-dimensional tree Algorithm, the like, or any combination thereof. The methods may be related to density and/or grey level.

Judging unit 312 is configurable to judge spatial relations between a cutting region and a projection region on a projection plane. As used herein, the exemplary projection plane may be a 2-D plane in relation to a desired viewpoint. Judging unit 312 may be connected with the dividing unit 311 and the marking unit 313.

Data among the three units, 311, 312 and 313 as depicted in FIG. 4, may be transmitted by wire or wireless. Merely by way of example, in a judgment operation, a parameter based on grey level or density may be incorporated into the judgment operation to affect its resultant. The steps of forming the projection region may include, but are not limit to, determining the projection point of the sub-space vertex of the sub-data on the projection plane and generate the projection region with the projection point. In some embodiments, the image data after space division is divided into a set of data nodes (including related data field and link field) with spatial relationships. The projection point and projection region calculation and the traversing of the image data can be accomplished with the aid of the sequential relationships among image data nodes within the image data set. The judging unit 312 may also be configured for judging whether the density value, gray value, depth value, diaphaneity value, or color may be within desired predetermined regions.

The judgment of the spatial relationships between the projection region and cutting region may include determining whether the projection region is contained in the cutting region, whether the projection region partially overlaps the cutting region, or whether the projection region is completely outside of the cutting region. The judging unit 312 may perform different operations to make such determinations. The judging unit 312 will send the result of the judgment to dividing unit 311 when the projection region overlaps with the cutting region in part, and the dividing unit 311 will divide and return data back to judging unit 312 to be judged again. This cycle will repeat until the projection region is contained in the cutting region or the projection region is completely outside of the cutting region, wherein at such time, judging unit 312 will send the judgment result to marking unit 313.

Judging unit 312 may rely on a method of traversing all projection points, or alternatively, a method based on only selected projection points. In one embodiment, the judging unit 312 may traverse all the projection point of sub-data in sub-space, and then compare the projection region of different projection points with the cutting region. In another embodiment, the judging unit 312 may compare the projection region of some special projection points with the cutting region. The special project point may be determined based operation requirements. For example, the special projection point may be defined by sub-space vertex, projection point of maximum density voxel or data node, projection point of minimum density voxel or data node, or the like, or a combination thereof. The judging unit 312 may be configured for judging whether the projection region is contained in the cutting region or to judge whether the projection region is completely outside of the cutting region.

Marking unit 313 is configurable to mark image data. The marking process of marking unit 313 is based on the judgment results of judging unit 312. The data marking of marking unit 313 may be performed on nodes or voxels. In some embodiments, the way of marking the image data by the marking unit 313 is via a data marker. More particularly, a data marker may be a value/number calculated by the marking unit 313, based on the judgment results of judging unit 312. The data marker may be a boolean value, binary number, octal number, decimal number, hexadecimal number, the like, or any combination thereof. Different data marker values may designate different characteristics. For example, '0' could designate cutting the data and may be used when the projection region is contained in the cutting region. The value '1' could designate retaining the data and may be used when the projection region is completely out of the cutting region. The rendering result may be co-determined by the original data and the data markers when perform volume rendering. The cutting effect may be achieved by not showing some data to the user so as to appear cut. When rendering the image, different data markers may be mapped to either the same or different rendering methods or strategies. For example, different data markers could designate either the same or different rendering colors.

In some embodiments, a mode of marking the image data may also include not designating any data marker to the image data.

In one embodiment, the operation of cutting may strategically traverse all the data node or voxel, and marking the data node or voxel. The data marker may be used to mark whether the data node or voxel should be cut. The rendering result may be co-determined by the original data and the data marker when performing volume rendering. For example, a value '0' may designate that the data node or voxel should be cut and it may even be displayed to the user. A value '1' may designate that the data node or voxel may not be cut and it may not be displayed to the user. The image data not displayed to the user shall appear to have been cut. In another embodiment, the data node or voxel marked may either be skipped or displayed when perform volume rendering. For example, the data node or voxel may be displayed only in a preset color.

This description is intended to be illustrative, and not to limit the scope of the present invention. Many alternatives, modifications, and variations will be apparent to those ordinarily skilled in the art. The features, structures, methods, and other characteristics of the exemplary embodiments described herein may be combined in various ways to obtain additional and/or alternative exemplary embodiments. Merely by way of example, imaging cutting engine 310 may include a control information receiving unit to receive said control information. As another example, imaging cutting engine 310 may not include a dividing unit as defined by 311 and the division information may be supplied with the image data being received by image cutting engine 310. Similar modifications should fall within the metes and bounds of the present disclosure.

Figure 5:
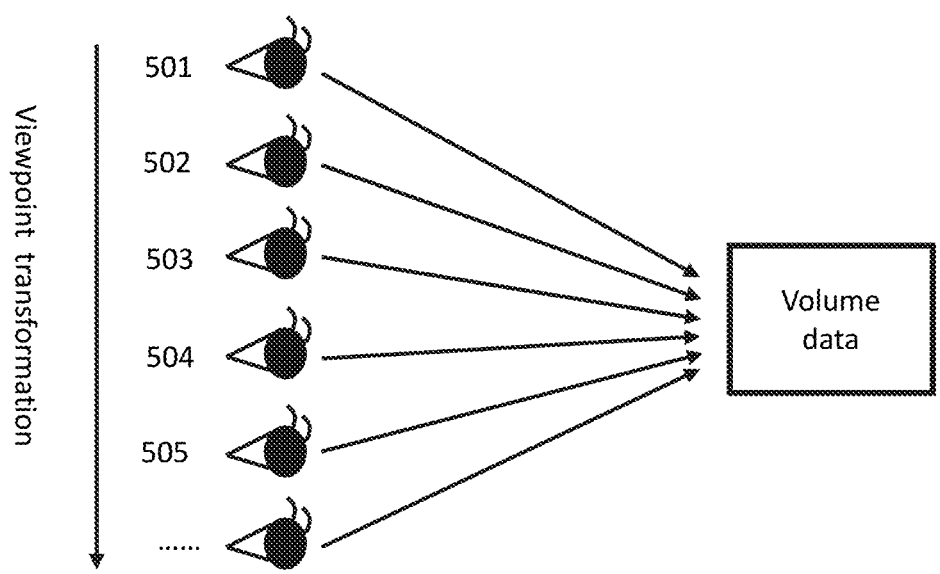
FIG. 5 is a schematic diagram showing the perspective transformation, according to some embodiments of the present disclosure.

FIG. 5 is a schematic diagram illustrating the viewpoint transformation, according to some embodiments of the present disclosure. As illustrated in FIG. 5, the projection region in the projection plane of the 3-D image data may be influenced by the change of viewpoint. Merely by way of example, cameras may be mounted at predetermined positions on a rear and left side of a gantry of an MRI apparatus or an X-ray CT apparatus, the optical axes of these cameras are directed obliquely downward to capture images having wide fields of vision at the rear and side of the gantry. These images are subjected to viewpoint transformation to form bird's eye view images. In some embodiments, the change of the viewpoint may change the projection plane.

Figure 6:
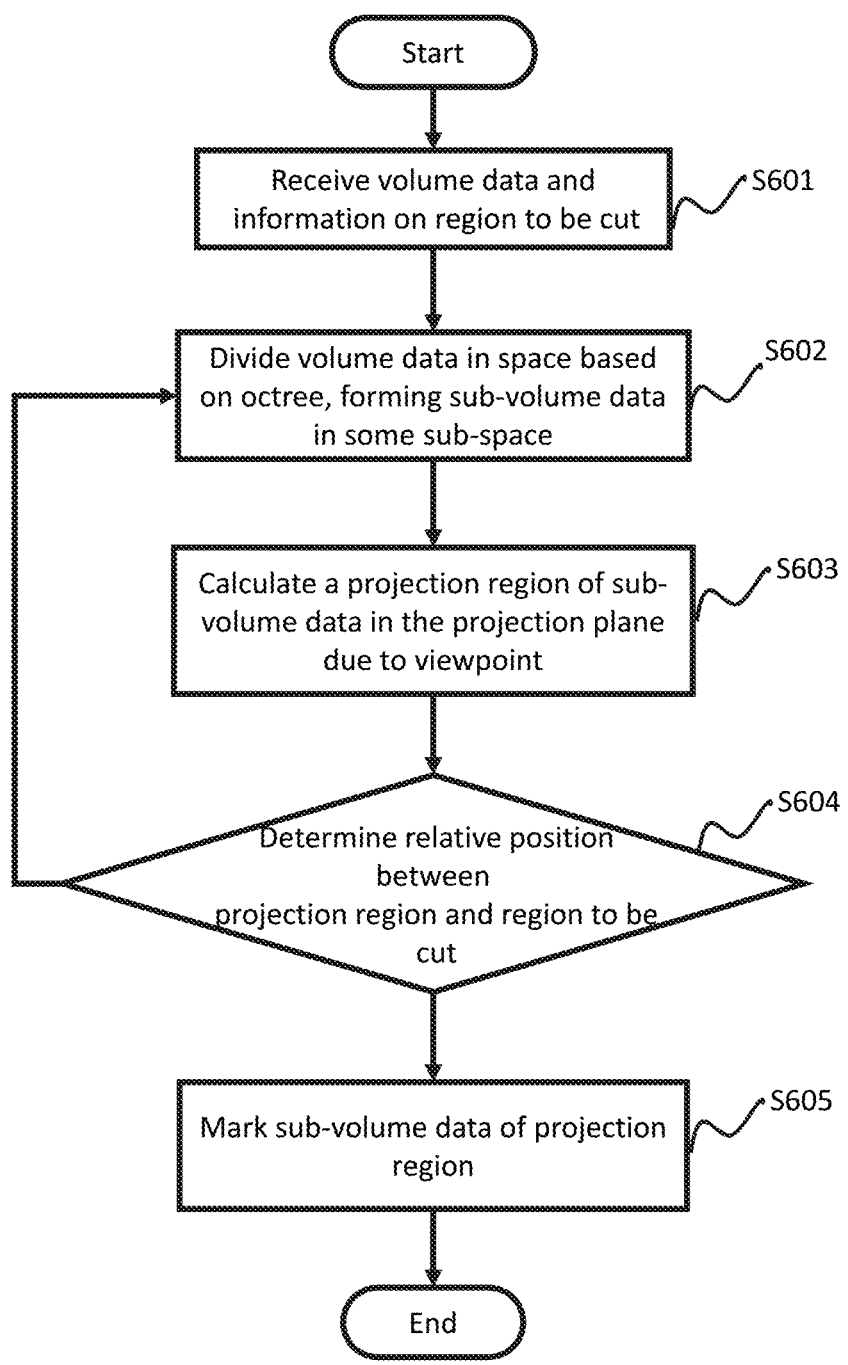
FIG. 6 is a flowchart of an exemplary process of marking region to be cut from the image, according to some embodiments of the present disclosure.

FIG. 6 is a flowchart of an exemplary process of marking region to be cut from the image, according to some embodiments of the present disclosure.

In step S601, volume data and information on the region to be cut from the projection plane may be received. In step S602, the image cutting engine 310 may generate octree data by forming a partition of the 3-D volume data in space, particularly, by forming sets of sub-volume data in corresponding sub-space. In step S603, a projection region of sub-volume data in the projection plane may be calculated. In step S604, the image cutting engine 310 may determine the relative position between the projection region and the region to be cut. If the projection region is contained in the region to be cut, or the projection region is completely out of the region to be cut, step S605 may be executed after step S604. In step S605, the sub-volume data corresponding to the projection region may be marked. The data marker may be different if the projection region is contained in the region to be cut or the projection region is completely outside of the region to be cut. If the projection region overlaps with the region to be cut in part, step S602 may be executed after step S604, in which case the sub-volume data may be partitioned accordingly.

This description is intended to be illustrative, and not to limit the scope of the present disclosure. Many alternatives, modifications, and variations will be apparent to those ordinarily skilled in the art. The features, structures, methods, and other characteristics of the exemplary embodiments described herein may be combined in various ways to obtain additional and/or alternative exemplary embodiments. Merely by way of example, information on region to cut may be received after step S603 and before step S604. As another example, the step S605 may always be executed after S604, without going to step S602. Meanwhile, some sub-volume data with particular data marker may be sent to step S602 to be divided once more. Similar modifications should fall within the metes and bounds of the present disclosure.

Figure 7:
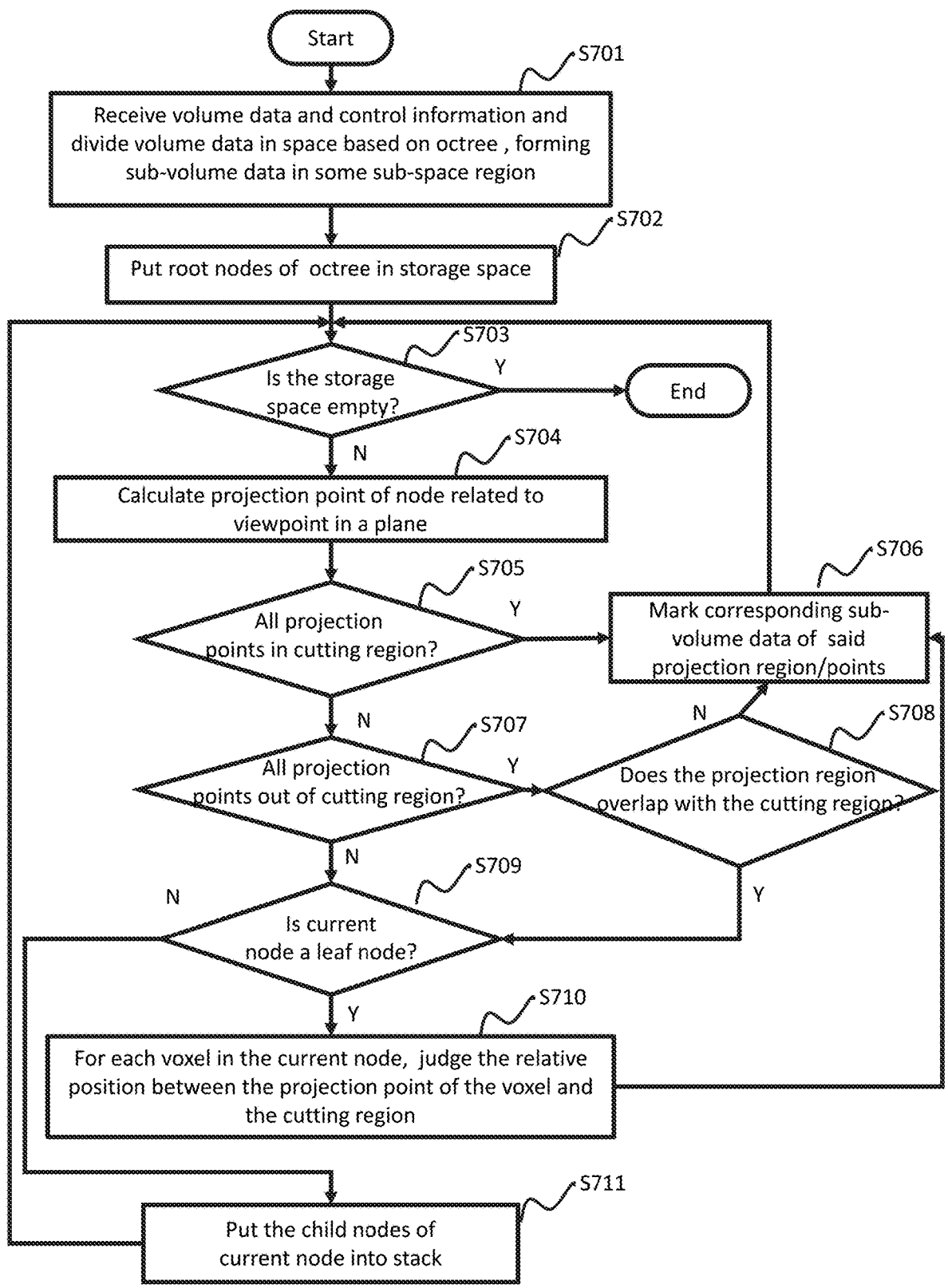
FIG. 7 is a flowchart of an exemplary process of marking cutting region in the projection plane according to some embodiments of the present disclosure.

FIG. 7 is a flowchart of an exemplary process of marking cutting region in the projection plane according to some embodiments of the present disclosure. As described in FIG. 7, the steps of marking cutting region include:

In step S701, receive image data and control information about cutting region and divide volume data in space based on octree, forming sub-volume data in some sub-space region. As used herein, an octree is a tree data structure in which each internal node has exactly eight children. The space division may be executed according to other methods. For example, the method for division may be Split and Merge Algorithm, Tree-based Split Algorithm, Adaptive-Bounding-Box based Spilt Algorithm, Node-Merging Algorithm, K-dimensional Tree Algorithm, the like, or any combination thereof. The Split Algorithm based on tree structure may be Octree Split-and-Merge algorithm for the three-dimensional data and Split-and-Merge algorithm based on four tree for the two-dimensional data. This description is intended to be illustrative, and not to limit the scope of the present disclosure.

In step S702, the root nodes of octree will be put into storage space. In some embodiments, the storage space may be buffer, register, the like, or any combination thereof. Various data structures may be used in storage space, for example, stack, queue, the like, or any combination thereof. In FIG. 7, stack will be used as an example, but the following is provided for illustration purposes only, and not intended to limit the scope of the present disclosure.

In step S703, a test will be executed to see whether the storage space is empty or not. If the storage space is empty, the process of image cutting will come to an end. If the storage space is not empty, the node at the top of the stack will be retrieved, and step S704 will be executed.

In step S704, a projection plane related to viewpoint will be provided, and the projection points of the node at the top of the stack will be calculated.

In step S705, all the projection points will be checked to see if they are in the cutting region. If all the projection points are in the cutting region, meaning that the corresponding projection region is contained in the cutting region, step S706 will be executed. If not all the projection points are in the cutting region, step S707 will be executed.

In step S706, the corresponding sub-volume data of related projection region/points will be marked. The process then goes back to step S703 to treat other nodes in the stack, if there are any nodes data left in the stack.

In step S707, a test will be executed to see whether all the projection points are out of the cutting region. If all the projection points are all out of the cutting region, step S708 will be executed. If the projection points are not all out of the cutting region, step S709 will be executed.

In step S708, whether there is an overlap of the projection region and the cutting region will be determined. In some embodiment, in order to simplify the calculation, the maximum projection region of the projection points will be calculated. That is to say, the projection region is a rectangle which is the smallest rectangle containing the projected vertices and in parallel to the axis of coordinates. If there is no overlap between the cutting region and the projection region, which means that the sub-volume data related to the projection region need not be partitioned, then step S706 will be executed. If there is an overlap between the cutting region and the projection region, which indicates that the sub-volume data related to the projection region still need to be partitioned, then step S709 will be executed.

In step S709, the present node will be tested to see if it is a leaf node. If the present node is a leaf node, then step S710 will be executed. If the present node is not a leaf node, then step S711 will be executed.

In step S710, for each voxel in the present node, a judgment about relative position between the projection points of each voxel and the cutting region will be made. Next, step S706 will be executed according to the judgment results. The image may be cut in the level of voxel using the method described above.

In step S711, the child nodes of present node will be put into the stack, so that the child nodes will be processed, starting from step S703.

This description is intended to be illustrative, and not to limit the scope of the present disclosure. Many alternatives, modifications, and variations will be apparent to those ordinarily skilled in the art. The features, structures, methods, and other characteristics of the exemplary embodiments described herein may be combined in various ways to obtain additional and/or alternative exemplary embodiments. Merely by way of example, the order of step S705, S707, S708, S709 can be changed as needed. Similar modifications should fall within the metes and bounds of the present disclosure.

Figure 8:
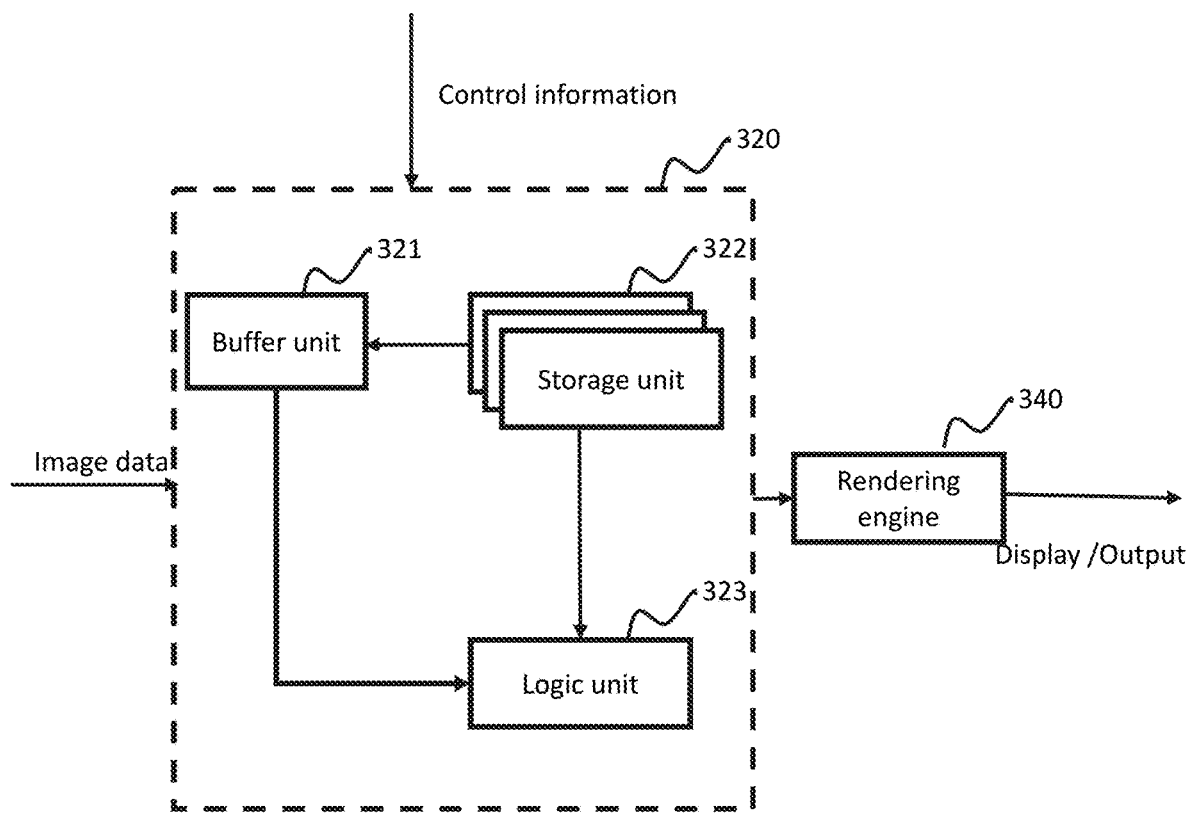
FIG. 8 shows an exemplary diagram of the ROI processing engine 320.

FIG. 8 shows an exemplary diagram of the ROI processing engine 320. The ROI processing engine 320 may be configured for rendering various regions of one or more images using same or different rendering methods. In some embodiments, the ROI processing engine 320 may be implemented using stencil testing. The ROI processing engine 320 may include one or more buffer units 321, one or more storage units 322, and one or more logic units 323. The ROI processing engine 320 may be connected with the rendering engine 340. The links within the ROI processing engine 320, as well as the link between the ROI processing engine 320 and the rendering engine 340, may be by wire or wireless.

The buffer unit 321 may be configured for storing one or more parameter values or marking data. The parameter values may include, but not limited to, stencil value, depth value, color value, alpha value, density value, gray value, the like, or any combination thereof. Marking data may be used to indicate meanings of the image data. For example, the marking data may indicate diaphaneity, gray level, density, color, depth, the like, or any combination thereof of the image data. In some embodiments, stencil values may be the voxels or pixels of the regions of interest of the images. The stencil value may be integer, unsigned integer, float, unsigned float, Boolean, N-nary number, the like, or any combination thereof. The images may be images captured by the image data acquisition module 201, the reconstructed image, the normalized image, the processed image by the image data processing module 202, the stored image in the image storage module 204, the like, or any combination thereof. The buffer unit 321 may include one or more depth buffers, one or more color buffers, one or more stencil buffers, one or more density buffers, one or more gray buffers, the like, or any combination thereof.

The storage unit 322 may be configured for storing one or more regions of images as stencils. The information about regions may be obtained through an external device or the internal image processing system. Merely by way of example, the boundary of regions may be specified by mouse, keyboard or figure in the screen, the like, or any combination thereof. The storage unit 322 may also be configured for storing other relevant information on the image in the system. For example, the storage unit 322 may store a threshold of gray value and/or density value for image processing.

The logic unit 323 may be configured for making certain logic operations so as to form the regions of interest. In some embodiments, the logic unit 323 may be configured for logic operations between a compare mask and the stencil values in the storage unit 322, and then comparing the results with the reference values to obtain stencil states. The logic operations may be AND operation, OR operation, NOT operation, XOR operations, the like, or any combination thereof. The results of logic unit 323 may include "always failure", "always pass", "pass when reference value is less than stencil value", "pass when reference value is less than or equal to stencil value", "pass when reference value is larger than stencil value", "pass when reference value is larger than or equal to stencil value", "pass when reference value is equal to stencil value", the like, or any combination thereof. The logic unit 323 may be configured for updating parameter values based on the results of the test. In some embodiments, the operation for updating color value may be stencil operation. The stencil operation may be related to the results of the stencil test and the depth test. The results of the stencil test and the depth test may include that "stencil test is failure", "stencil test is successful but the depth test is failure", "both stencil test and depth test are successful", or the like. The stencil operation may set various methods for updating the parameter value corresponding to the results. The methods for updating the parameter value may include, but not limited to, keeping the values unchanged, resetting the values as zero, setting the values as reference values, adding 1 to the values, subtracting 1 to the values, operating bitwise to the values, the like, or any combination thereof. The stencil operation may be implemented through writing mask.

The description of the exemplary embodiments herein is intended to be illustrative, and not to limit the scope of the present disclosure. Many alternatives, modifications, and variations will be apparent to those ordinarily skilled in the art. The features, structures, methods, and other characteristics of the exemplary embodiments described herein may be combined in various ways to obtain additional and/or alternative exemplary embodiments. For example, the buffer unit 321 may only include depth buffer and stencil buffer. As another example, the ROI processing engine 320 may not contain the storage unit 322, wherein the information about the region may be input by users.

Figure 9:
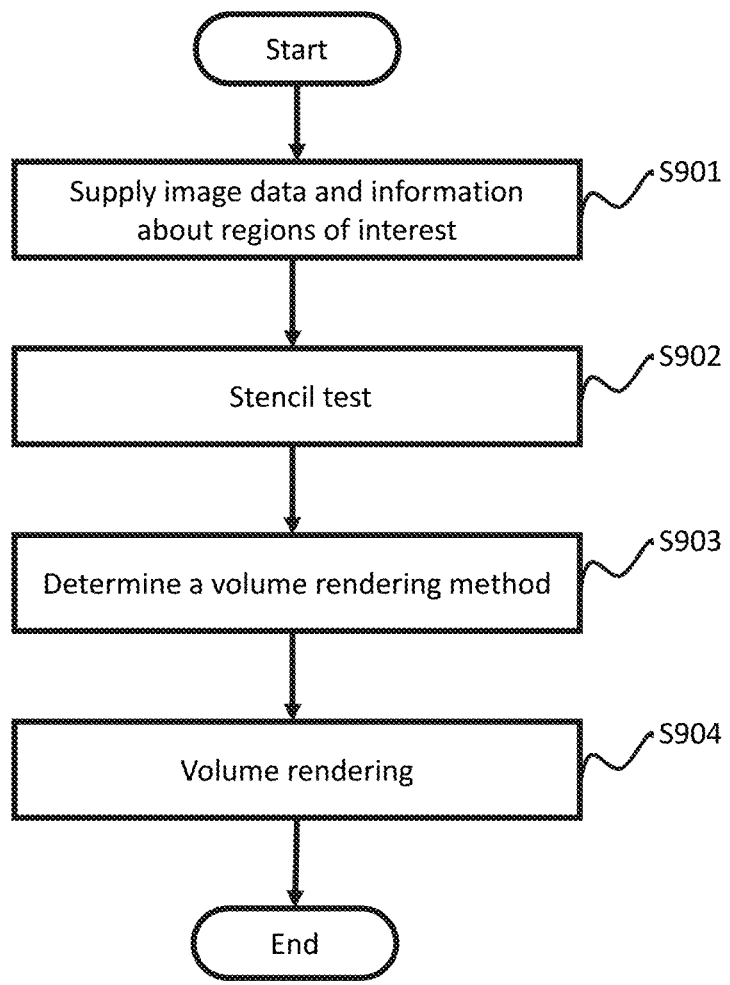
FIG. 9 is a flow chart showing an exemplary process of the ROI processing engine 320 for rendering the various regions using different rendering method according to some embodiment of the present disclosure.

FIG. 9 is a flow chart showing an exemplary process of the ROI processing engine 320 for rendering various regions using different rendering methods according to some embodiment of the present disclosure. The image data and information about regions of interest, such as those represented as stencils, may be acquired in step S901. The test between the stencil and regions of image may be performed in step S902. In step S903, a proper rendering method may be selected for each region of interest based on the results of the test. Rendering the regions of interest using the selected rendering methods and post processing may take place in step S904.

The image data acquired in step S901 may be from the image data acquisition module 201 or the image storage module 204. The image data may be medical image data, atmosphere stereo image data or geological layer image data. The stencils acquired in step S901 may be set by users or from the storage unit 322. The number of stencils may be one or more. Each stencil may correspond to a region of interest respectively. For example, the region of interest may be related to the shape of the lesions or organs exhibited in medical images. The region of interest may be set through delineating a portion of an image by mouse, keyboard, touchscreen or somatosensory device, the like, or any combination thereof.

The test in step S902 may include the following: setting reference values, comparing the stencil values with the reference values, obtaining the result of the test. The method for comparing may be logic operations, for example, AND operation, OR operation, NOT operation, XOR operations, the like, or any combination thereof. There may be color test, depth test or alpha test besides stencil test. The order of the various tests may be arranged freely. Merely by way of example, the test order may be alpha test, stencil test, and depth test.

The rendering method described in step S903 may be volume rendering, MIP (Maximum Intensity Projection) rendering, Minimum Intensity Projection rendering, Average rendering, Multi-Planner Reformation rendering, Shaded Surface rendering, Digital Reconstruction Radiography rendering, the like, or any combination thereof. The rendering may also differ in some aspects of the image rendering, such as color rendering, depth rendering, diaphaneity rendering, alpha rendering, the like, or any combination thereof. The selection of the rendering method may be based on the results of the test in step S902. However, the selection of the rendering method also may be set by the user or the system. For example, the user can set the MIP rendering when rendering a region of image.

The rendering described in step S904 may be implemented using the selected rendering method in step S903. The post-processing described in step S904 may include displaying, operating on the image from users, operating on the image from another module in the image processing system, the like, or any combination thereof. The displaying processing may include sub-screen displaying, contrast displaying, amplification displaying, the like, or any combination thereof. The operation on the image may include cutting, magnifying, window adjusting, rotating, processing batch, the like, or any combination thereof. The operation on the image from another module may include generating image mosaic, 3-D cutting, volume rendering, and so on.

This description of exemplary embodiment is intended to be illustrative, and not to limit the scope of the claims. Many alternatives, modifications, and variations will be apparent to those ordinarily skilled in the art. The features, structures, methods, and other characteristics of the exemplary embodiments described herein may be combined in various ways to obtain additional and/or alternative exemplary embodiments. For example, the step S902 may initiate one or multiple alpha tests or one or multiple depth tests after stencil test.

Figure 10:
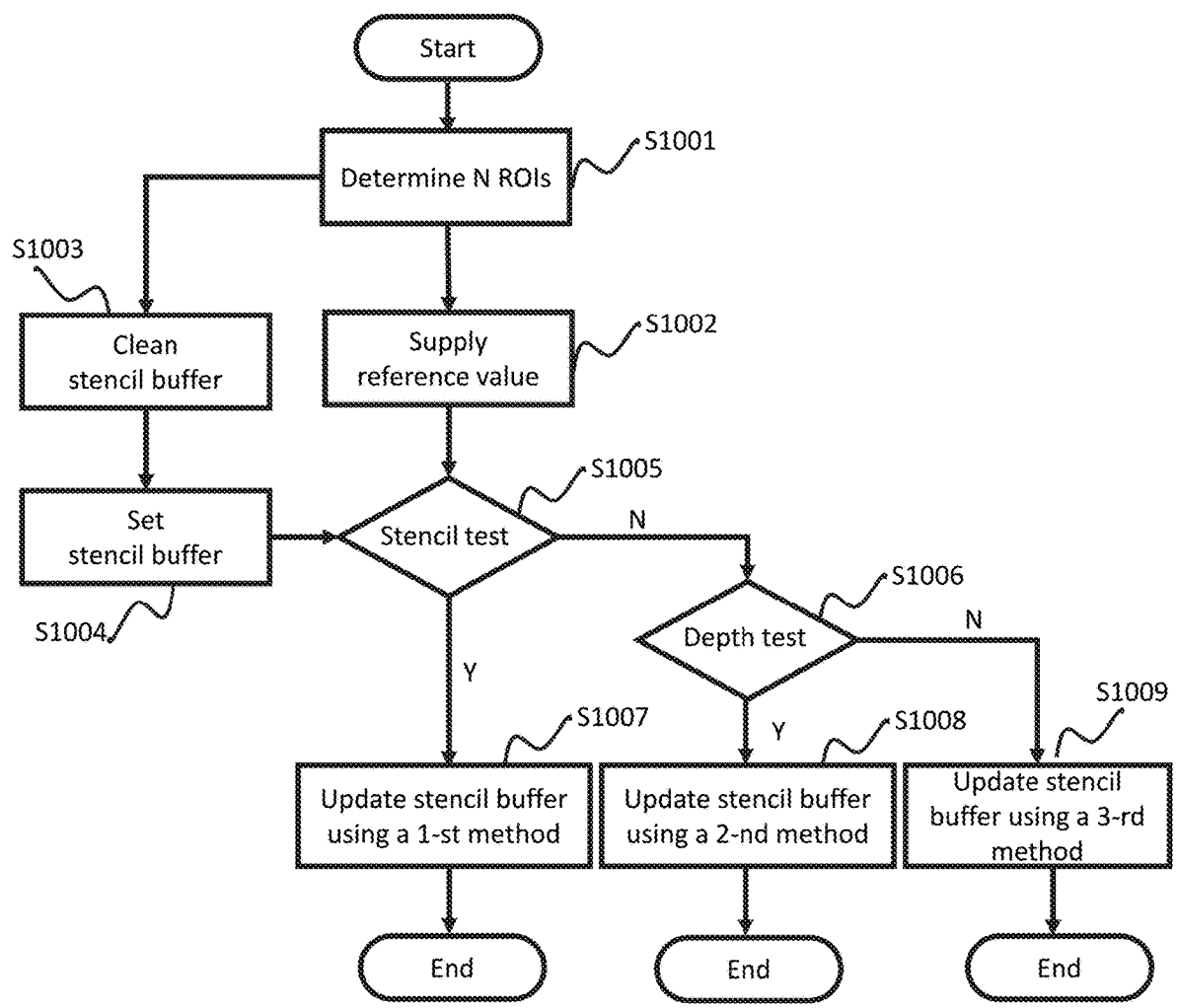
FIG. 10 shows another exemplary flow chart which describes the procedure updating the parameter values in the buffer unit 321.

FIG. 10 shows another exemplary flow chart which describes the procedure updating the parameter values in the buffer unit 321. The steps may be described as follows:

Step S1001, select N regions of interest through setting margin of the regions;

Step S1002, set each margin with a reference value;

Step S1003, clear the stencil buffer;

Step S1004, set the stencil buffer based on the margins, assign stencil values for pixels in the region;

Step S1005, compare the stencil values with the reference value, and decide whether the test passes or not. If the answer is yes, the flow advances to step S1006, otherwise the flow advances to step S1007;

Step S1006, update the values in the buffer unit 321 using the first updating method;

Step S1007, start the depth test, if the depth test passes, the flow advances to step S1008, otherwise the flow advances to step S1009;

Step S1008, update the values in the buffer unit 321 using the second updating method;

Step S1009, update the values in the buffer unit 321 using the third updating method;

The updating methods described above may be those that keeping the values unchanged, resetting the values as zero, setting the values as reference values, adding 1 to the values, subtracting 1 to the values, operating bitwise to the values, the like, or any combination thereof. The reference values described above may be set as i when setting the i-th region of interest. When testing the i-th region of interest, the i-th region of interest may be colored only when the test has passed, and the result of color may be kept in the color buffer. If there is next region of interest, then set reference value as i+1, and repeat the operations. Otherwise, select the rendering method for the uninterested region and set the reference value and stencil value as zero, repeat the above operations.

This description is intended to be illustrative, and not to limit the scope of the claims. Many alternatives, modifications, and variations will be apparent to those ordinarily skilled in the art. The features, structures, methods, and other characteristics of the exemplary embodiments described herein may be combined in various ways to obtain additional and/or alternative exemplary embodiments. For example, the margin is not the only way to select the region of interest. The region of interest also can be selected by the mouse, keyboard, figures, somatosensory device, the like, or any combination thereof.

Figure 11:
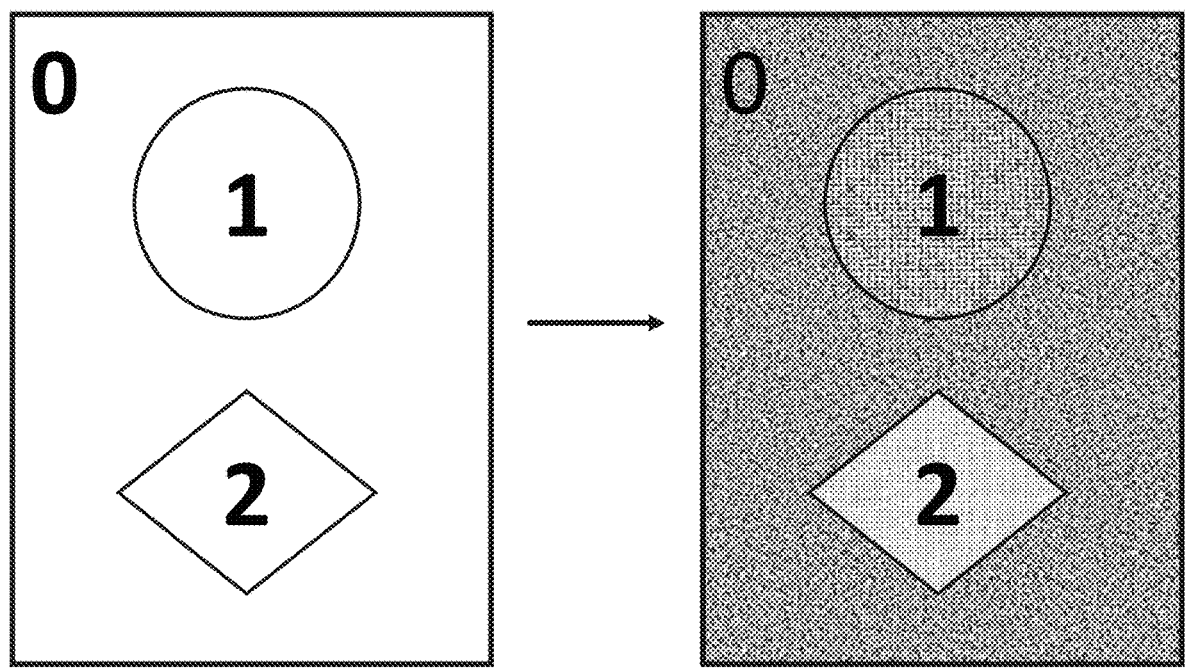
FIG. 11 shows an exemplary result of ROI processing engine 320.

FIG. 11 shows an exemplary result of ROI processing engine 320. The region of interest may be any shape in the image. For convenience, FIG. 11 lists two subject regions labeled as 1 and 2. The buffer unit 321 stores the stencil values of the pixels as 1 and 2 corresponding to its respective regions 1 and 2. When rendering region 1, the reference value may be set as 1 and be compared with the stencil values. If the stencil value is equal to the reference value, the corresponding pixel may be rendered using the rendering method corresponding to region 1. When rendering region 2, the reference value may be set as 2 and compared with the stencil values. If the stencil value is equal to the reference value, then the corresponding pixel may be rendered using the rendering method corresponding to region 2. Finally when rendering background region labeled as 0, the reference value may be set as 0 and compared with the stencil values. If the stencil value is equal to the reference value, the corresponding pixel may be rendered using the rendering method corresponding to the region 0.

Figure 12:
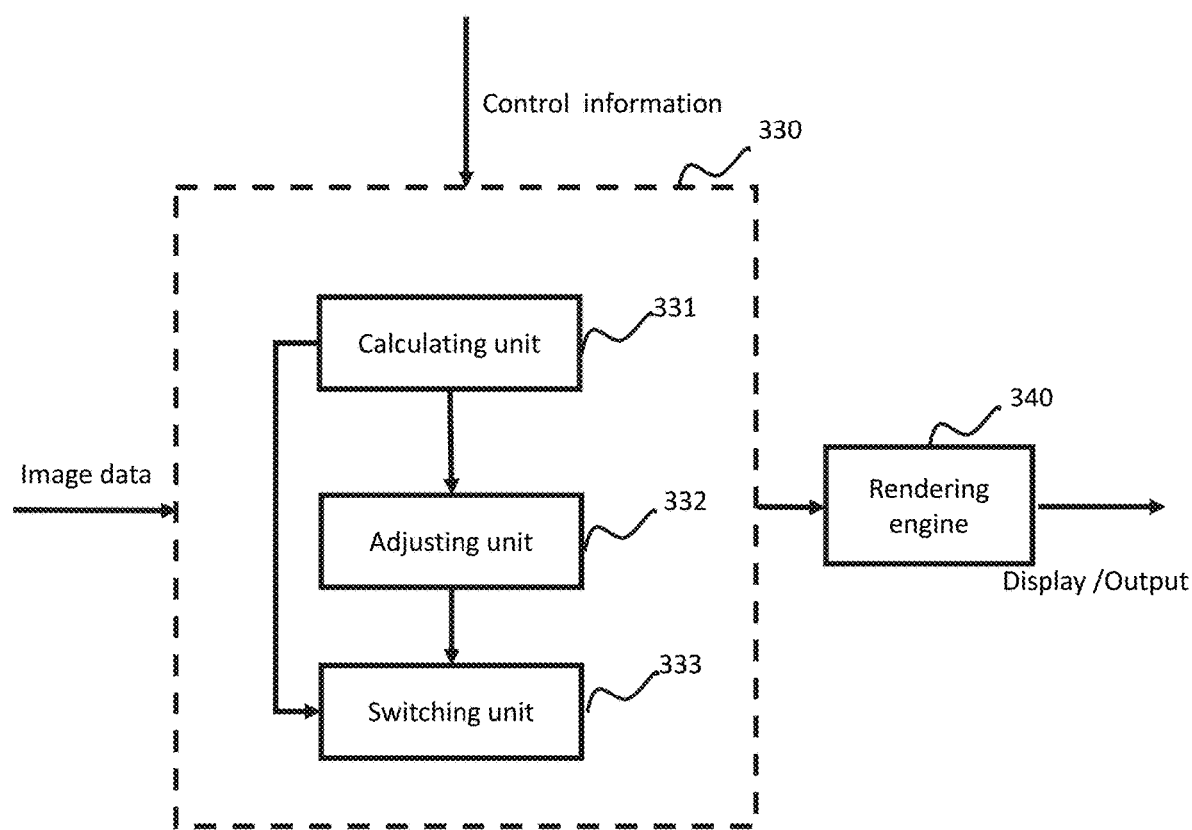
FIG. 12 depicts an exemplary diagram of a VSR processing engine 330.

FIG. 12 depicts an exemplary diagram of a VSR processing engine 330. The VSR processing engine 330 is configurable to perform volume rendering based on sampling rate. The VSR processing engine 330 may include any combination of one or more of any selection from the following items: calculating unit 331, adjusting unit 332, and switching unit 333. The VSR processing engine 330 is configurable to acquiring image data and control information, and then performing a sequence of processing to determine the method to be used for volume rendering. The image data is typically received by VSR processing engine 330 through image acquisition device 101 or the image storage module 103 data acquisition device. Control information received by VSR processing engine 330 may include the operation information from users or adaptive information generated internally by the system. The rendering engine 340 is configurable to render display/output data based on results of VSR processing engine 330 it receives.

A calculating unit 331 is configurable to calculate feature parameters and to further calculate a sampling rate based on the mapping function and said calculated feature parameters. The feature parameters may include level of detail (LOD) of screen image, scaling factor between screen image and global image, ratio factor of visible regions between screen image and global image.

The level of detail (LOD) parameter of screen image indicates different levels of details. Models with different levels of details may be built based on an original image to decrease the complexity of calculation and improve efficiency when rendering an image with a specific desired level of detail. In contrast with the original image, the models with different levels of details may retain its level of detail variables. In order not to effect its appearance to users, different levels of details may be chosen based on the distance of the present viewpoint and the size of scaling observed by users. For example, LOD may indicate the change of distance between the object and the viewpoint of the user when the user wishes to performs a translation operation. LOD may be higher and details of image may be presented less when the distance between the object and the viewpoint of the users increases. LOD may be lower and details of the image may be presented more when the distance between the object and the viewpoint of the users decreases. Therefore, the image processing system may be configured to change the present LOD in response to the interacting operation (e.g., translate the image near or far) by users and then adjusting the present sampling rate adaptively based on a preset mapping function.

The scaling factor between screen image and total image may indicate the display scale of the present image shown relative to total image by default. The scaling factor may be smaller or larger when the user performs scaling operation. Therefore, the image processing system may be configured to determine the real-time interactive operation (e.g., shrinking or enlarging the image) by users based on the present scaling factor and then adjusting the present sampling rate adaptively based on pre-set mapping function.

The ratio of visible regions between screen image and total image indicates the display scale of the visible region of screen image relative to the visible region of total image. The ratio may decrease when users perform expanding operation, and the ratio may increase when users perform shrinking operation. Therefore, the image processing system may be configured to detect the type of interactive operation (e.g., shrinking or enlarging the image) on-the-fly, based on feature parameters, and then adjust the present sampling rate simultaneously based on pre-set mapping function.

The feature parameters may be calculated internally in the imaging system, or input by the user during the interaction between the user and the image processing system. The input by users may be, but not limited to, graphics, image, speech, somatosensory, character, the like, or any combination thereof. The input devices may include, but not limited to, mouse, keyboard, stylus, touch screen, light pen, joystick, somatosensory equipment, the like, or any combination thereof.

The calculating unit 331 may be configured to calculate sampling rates based on certain feature parameter, and then select one of the calculated sampling rates as the actual sampling rate. The calculating unit 331 may also be configured to calculate the sampling rates based on two or more feature parameters, and then select an actual sampling rate. The method for selecting the actual sampling rate may include averaging, maximizing, minimizing, taking intermediate value, the like, or any combination thereof. The calculating unit 331 may calculate the sampling rates based on the mapping function between the sampling rates and the feature parameters. The mapping function may be linear such that the sampling rates may be in proportion to one or more feature parameters. The mapping function may also be non-linear, such as exponential function, Poisson function, parabola function, hyperbola function, the like, or any combination thereof.

The adjusting unit 332 may be configured to dynamically adjust the sampling rate, i.e. the adjusting unit 332 may be configured to receive the actual sampling rate calculated by calculating unit 331, and accordingly adjust simultaneously sampling rate of the image shown on the screen. The rendering engine 340 may be configured to perform volume rendering based on the adjusted practical sampling rate.

The switching unit 333 may be configured to modify the volume rendering method used when the actual sampling rate goes beyond pre-determined thresholds. The switching unit 333 may be configured to set various threshold ranges, each threshold range being determined by a lower threshold value and an upper threshold value, corresponding to a volume rendering method. The switching unit 333 may be configured to compare the actual sampling rate with lower threshold values and upper threshold values, and then select a corresponding volume rendering method.

The modules or devices described above are not indispensable, and for a person having ordinary skill in the art, based on the content and principle of the present disclosure, the form and details in the system may be modified or changed without departing from certain principles and structures. The modifications and changes may include any combination of the modules, or the formation of subsystems which may connect with other modules, and these modifications and changes are still within the scope of the claims. For example, switching unit 333 may be not necessary, rendering engine 340 may directly perform corresponding volume rendering method after the sampling rate is real-timely adjusted by adjusting unit 332.

FIG. 13-A and FIG. 13-B are flowchart diagrams of performing different volume rendering methods based on different sampling rates.

FIG. 13-A is a flowchart diagram showing an exemplary process for performing volume rendering based on sampling rate, which may include the following steps. The volume data of present shown image may be acquired in step S13A1. The feature parameters of present shown image may be calculated in step S13A2. The sampling rate of present shown image may be calculated based on the feature parameter and mapping function in step S13A3. Then in step S13A4 the calculated sampling rate may be used for rendering the volume data.

In one embodiment, when the scaling factor increases, the image processing system may determine the occurrence of an amplification operation on the image, and decrease the sampling rate accordingly. When the LOD and the ratio factor of visible region between screen image and total image decreases, the image processing system may increase the sampling rate to present the image in more detail on-the-fly. If more feature parameters have changed, the sampling rate may increase or decrease according to the mapping function between the feature parameters and the sampling rate.

FIG. 13-B is a flowchart diagram showing an exemplary process for performing corresponding volume rendering methods based on sampling rate, which may include the following steps:

Step S13B1, perform the operation of initialization, receive image data, set a threshold interval and related rendering method.

Step S13B2, calculate a sampling rate.

Step S13B3, compare the sampling rate with the lower and upper threshold, making decision about to which interval of threshold the sampling rate belongs.

Step S13B4, determine a volume rendering method according to the result of the comparison in step S13B3.

Step S13B5, perform the operation of volume rendering.

Figure 14:
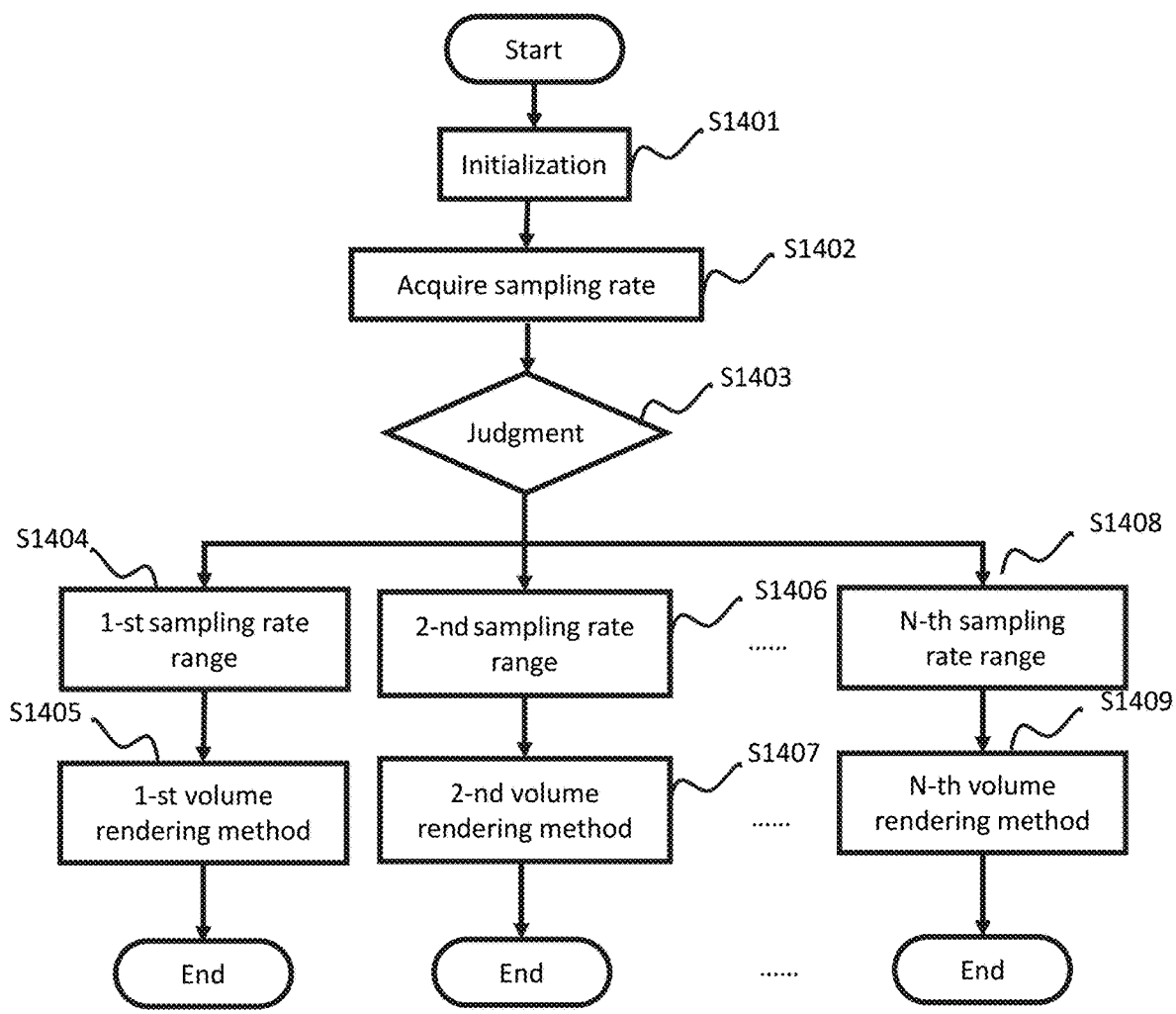
FIG. 14 is a flowchart diagram of performing volume rendering choosing from N volume rendering methods based on sampling rate.

FIG. 14 is a flowchart diagram of performing volume rendering method choosing from N volume rendering method based on sampling rate.

An initialization may be performed in step S1401. The initialization may include set N threshold intervals with its lower threshold and upper threshold. The initialization may also include set N rendering methods and corresponding threshold intervals. N may be any positive integer.

In step S1402, a sampling rate of present shown image may be calculated based on some feature parameters.

In step S1403, which threshold interval the sampling rate belongs to will be determined. The method of the judgment may be set by a plenty of means. For example, the judgment method implemented in the step S1403 may include insertion sort, bubble sort, quick sort, heap sort, shell sort, simple select sort or the like algorithms to quickly determine the sampling rate located in which threshold interval.

If the sampling rate were judged to locate in the first sampling rate interval in the step S1403, then step S1404 will be executed firstly and then step S1405 will be executed next. In such a situation, a volume rendering method corresponding the first sampling rate interval will be used to render the image. If the sampling rate were judged to locate in the second sampling rate interval in the step S1403, then step S1406 will be executed first and step S1407 will be executed in the next. In such a situation, a volume rendering method corresponding the second sampling rate interval will be used to render the image. If the sampling rate were judged to locate in the N-th sampling rate interval in the step S1403, then step S1408 will be executed first and step S1409 will be executed in the next. In such a situation, a volume rendering method corresponding the N-th sampling rate interval will be used to render the image.

Figure 15:
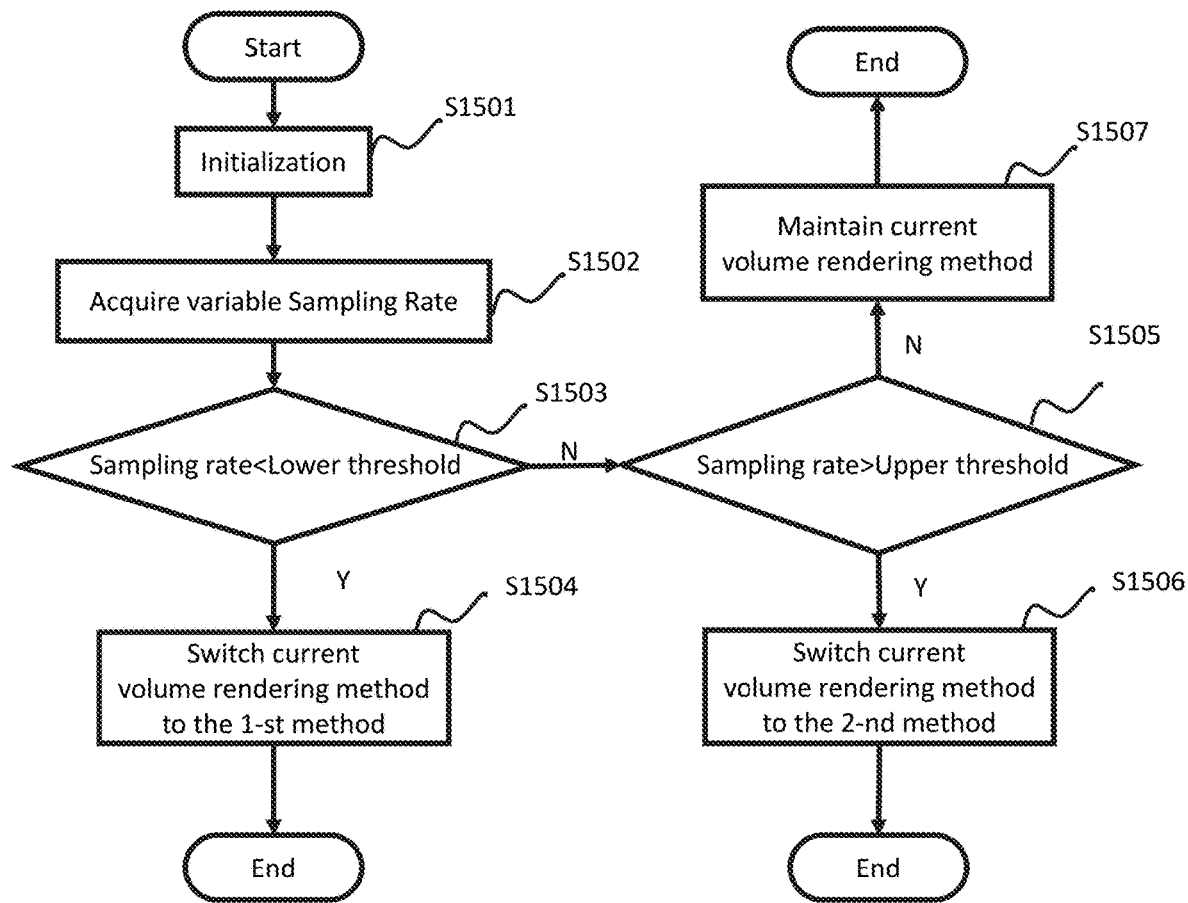
FIG. 15 shows the exemplary process of N=2 for adaptive performing corresponding volume rendering method based on the sampling rate.

The exemplary process of N=2 for adaptive performing corresponding volume rendering method based on the sampling rate is showed in FIG. 15. An initialization may be performed in step S1501, the initialization may include set a threshold interval with its lower threshold and upper threshold, set a calculation method of sampling rate, set two volume rendering methods, set mapping function, determine the present parameters, or the like. In step S1502, a present sampling rate of shown image may be calculated based on the feature parameters and mapping function. In step S1503, a determination whether the sampling rate is less than the lower threshold may be made. If the sampling rate was less than the lower threshold, present volume rendering method may be switched to the first volume rendering method in the step S1504. If the sampling rate was not less than the lower threshold, step S1505 will be executed. In step S1505, a determination whether the sampling rate is greater than the upper threshold may be made. If the sampling rate is greater than the upper threshold, step S1506 will be executed. If the sampling rate is not greater than the upper threshold, step S1507 will be executed. In step S1506, the present rendering method will be switched to the second volume rendering method. In step S1507, the present rendering method will not be changed.

In some embodiment, the volume rendering methods may include acquiring information about integer pixel sampling points chosen from the neighborhood of non-integer pixel sampling points, and/or acquiring information about non-integer pixel sampling points. The difference between volume rendering methods may be different sizes of chosen neighborhoods. To obtain better image quality, integer pixel sampling points may be divided into several sub-pixels for further sample processing. When the chosen neighborhood of volume rendering method is larger, the sub-pixels thereof may be smaller to ensure better image quality. For example, the diameter of pulmonary nodules is within the range of 3 mm to 30 mm, thus it is difficult to meet the requirements of users by means of increasing sampling rate, when the pulmonary nodules need to be enlarged to ensure higher resolution of the medical image. Therefore, the present volume rendering method may be adaptively switched (e.g., switch to a different volume rendering method which chooses a larger neighborhood) based on the requirements of user to ensure better image quality.

EMBODIMENTS

The following examples are provided for illustration purposes, and not intended to limit the scope of the present disclosure.

Embodiment 1

Figure 16:
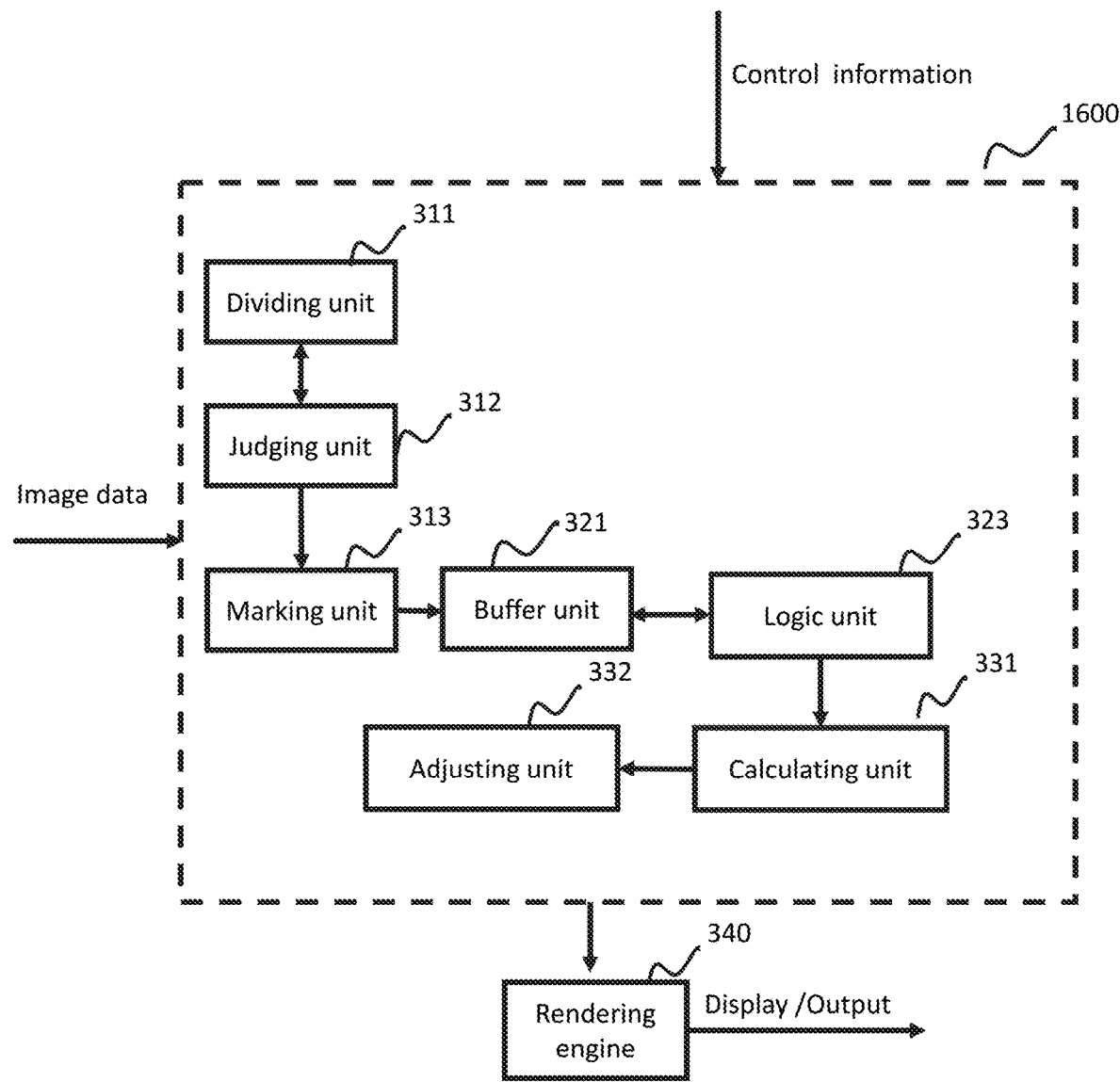
FIG. 16 shows an exemplary diagram of a function module 1600 which describes the cooperation between the image cutting engine 310, the ROI processing engine 320, the VSR processing engine 330 for processing volume data.

FIG. 16 shows an exemplary diagram of a function module 1600 which describes the cooperation among the image cutting engine 310, the ROI processing engine 320, the VSR processing engine 330 for processing volume data. The function module 1600 may enable image clipping, rendering the region of interest and image rendering based on sampling rate set by users. The function module 1600 may include dividing unit 311, judging unit 312, marking unit 313, buffer unit 321, logic unit 323, calculating unit 331 and adjusting unit 332, the like, or any combination thereof. The function module 1600 may transfer the volume data to the rendering engine 340 for rendering based upon the rendering method selected. The function module 1600 may be configured for acquiring image data and control information related to one or more subjects. As used herein, the volume data may be from an image data acquisition device, image data processing device, or storage device. The control information may be a signal received or information sensed or detected by, e.g., a sensor. Furthermore, the control information may be from a subject or from a user other than the subject (e.g., a doctor, a viewer, a care provider, a family member relating to the subject, a patient, the like, or any combination thereof). The control information may include region information, display information, rendering information, operation from a subject or from a user other than the subject, the mapping information between regions and the rendering method, the like, or any combination thereof.

Each unit in the function module 1600 may process the image data and control information. For example, the dividing unit 311 may be configured for dividing the image data based on the control information. For another example, the buffer unit 321 or calculating unit 331 may be operable to store or compute the parameter profile of the image. The parameter profile may include characteristic parameters, sampling rate, gray level, density value, depth value, projection, region information, the like, or any combination thereof. The judging unit 312 may be configured for judging whether the information from dividing unit 311 satisfies certain predetermined conditions. The judged information may include relationship between projection region and region of interest, the density value, the sampling rate, the gray level, the depth value, the like, or any combination thereof. The pre-determined condition may include condition that the projection of image is contained in the region; the depth value, the density value, the sampling rate or the gray level is in a preset range, the like, or any combination thereof. The dividing unit 311 may be operable to divide the image data based on the result of the judging unit 312. The marking unit 313 may be configured for providing a marking data. The marked objects may include the image data, pixels, voxels, nodes, regions corresponding to the image data, the like, or any combination thereof. The marking data may be based on the results of the judging unit 312, the region information, the depth value, the density value, the sampling rate, the gray level, the like, or any combination thereof. The marking data may be stored in the buffer unit 321. The marking data may be used for initiating further process, such as rendering, logic operation, calculating, the like, or any combination thereof.

Buffer unit 321 may be configured for storing partial or all control information, the marking data, the stencil value, the depth value, the alpha value, the color value, the density value, the gray level, the diaphaneity, the like, or any combination thereof. The data stored in the buffer unit 321 may be configured for judging, logic operation, or calculating, the like, or any combination thereof. The buffer unit 321 may communicate with other units in the function module 1600. The logic unit 323 may be configured for providing logic operation. The objects used for logic operation may include the data stored in the buffer unit 321, the value preset by the image processing system or some units in the function module 1600, the marking data, the parameter profile, the sampling rate, or the like, or the combination thereof. The logic unit 323 may be configured for outputting the results of the logic operation for the post processing. The dividing unit 311 may be configured for computing the parameter profile of the image data. The calculation may be based on the partial or all control information. The adjusting unit 332 may be configured for changing the parameter for rendering image adaptively based on the parameter profile of the image data. If the parameter has been changed, it might be configured for outputting the parameter for rendering or the post processing. The parameter may be the sampling rate, interval between points sampled, the size of pixels or voxels, the like, or any combination thereof.

This description is intended to illustrate, and not to limit the scope of the claims. Many alternatives, modifications, and variations will be apparent to those ordinarily skilled in the art. The features, structures, methods, and other characteristics of the exemplary embodiments described herein may be combined in various ways to obtain additional and/or alternative exemplary embodiments. For example, the function module 1600 may also include one or more switching unit 333. The switching unit 333 may be configured for selecting a proper rendering method to render the image data. The switching unit 333 may acquire the data stored in the buffer unit, control information, the parameter profile, the results of the logic operation, the results of the judging unit 312, the like, or any combination thereof. The switching unit 333 may switch the rendering method based on the information acquired. For another example, the function module 1600 may not include the buffer unit 321, the intermediate information in the function module 1600 may be processed in the real-time, such as the marking data may be output or transferred to the logic unit directly.

Figure 17:
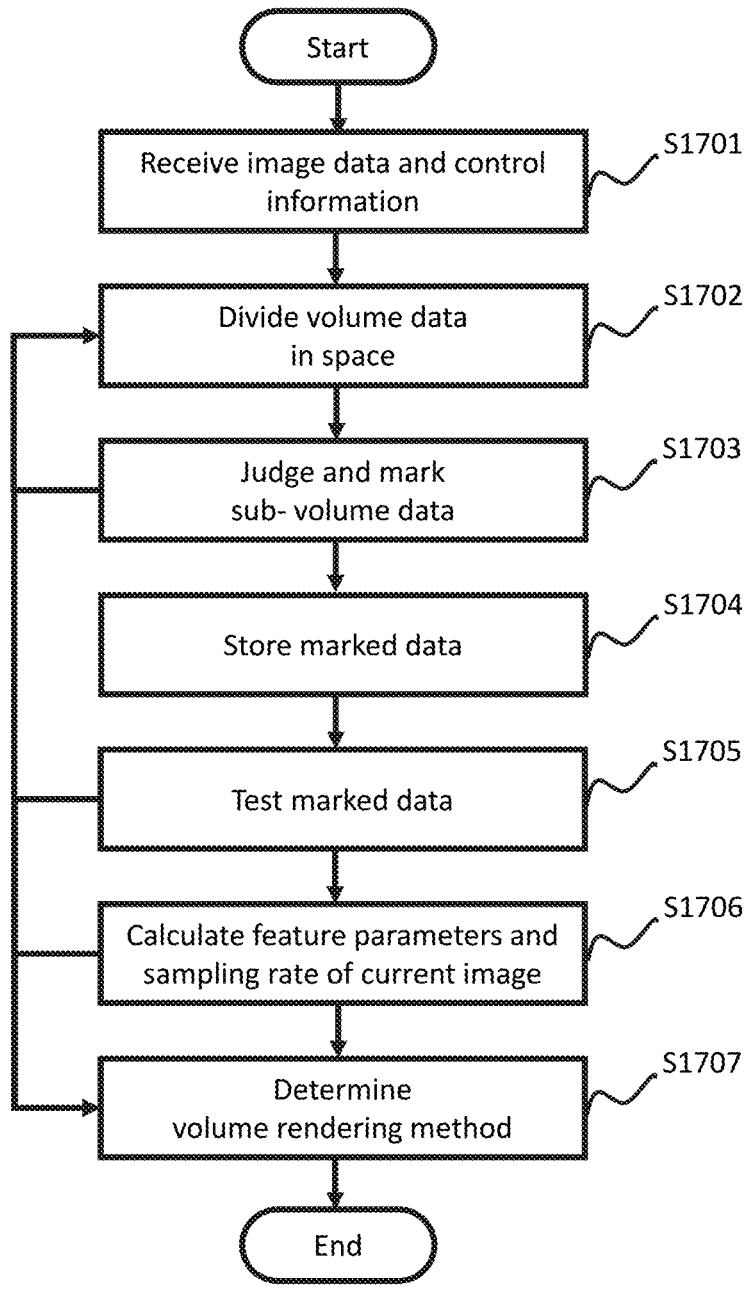
FIG. 17 is a flow chart showing an exemplary process of the function module 1600 according to the present disclosure.

FIG. 17 is a flow chart showing an exemplary process of the function module 1600 according to the present disclosure. Image data and control information including region regarding a subject may be acquired in step S1701. Then the procedure where the image data is divided based on part or all control information into sub-image data may be implemented in step S1702. Next, whether the projection of sub-image data lies inside the region of interest is judged in step S1703. The flow may advance to different steps based on the result of judgment. For example, if the projection is not contained in the region of interest, the flow may advance to step S1702 again. Otherwise the flow may advance to the step S1704 or step S1707 for next processing. Besides, the sub-image data may be marked in step S1703. The marking operation may be based on the judgment or control information. The marking data may be stored in step S1705. Then in step S1706, the marking data may be configured for logic operation or compared with pre-set values. The results of the logic operation or comparison may be output directly or be transferred to next step for post processing. The post processing may include calculating characteristic parameters or the sampling rate in step S1706. The results of the calculating may be transferred to the step 1707 to select a proper volume rendering method for rendering image.

This description is intended to be illustrative, and not to limit the scope of the claims. Many alternatives, modifications, and variations will be apparent to those ordinarily skilled in the art. The features, structures, methods, and other characteristics of the exemplary embodiments described herein may be combined in various ways to obtain additional and/or alternative exemplary embodiments. For example, either consequence of step S1703, S1705 may lead to determining volume rendering method for post-processing. For another example, the image data and control information may be received in alternative steps such as step S1704, S1706, S1707, the like, or any combination thereof.

Embodiment 2

Figure 18:
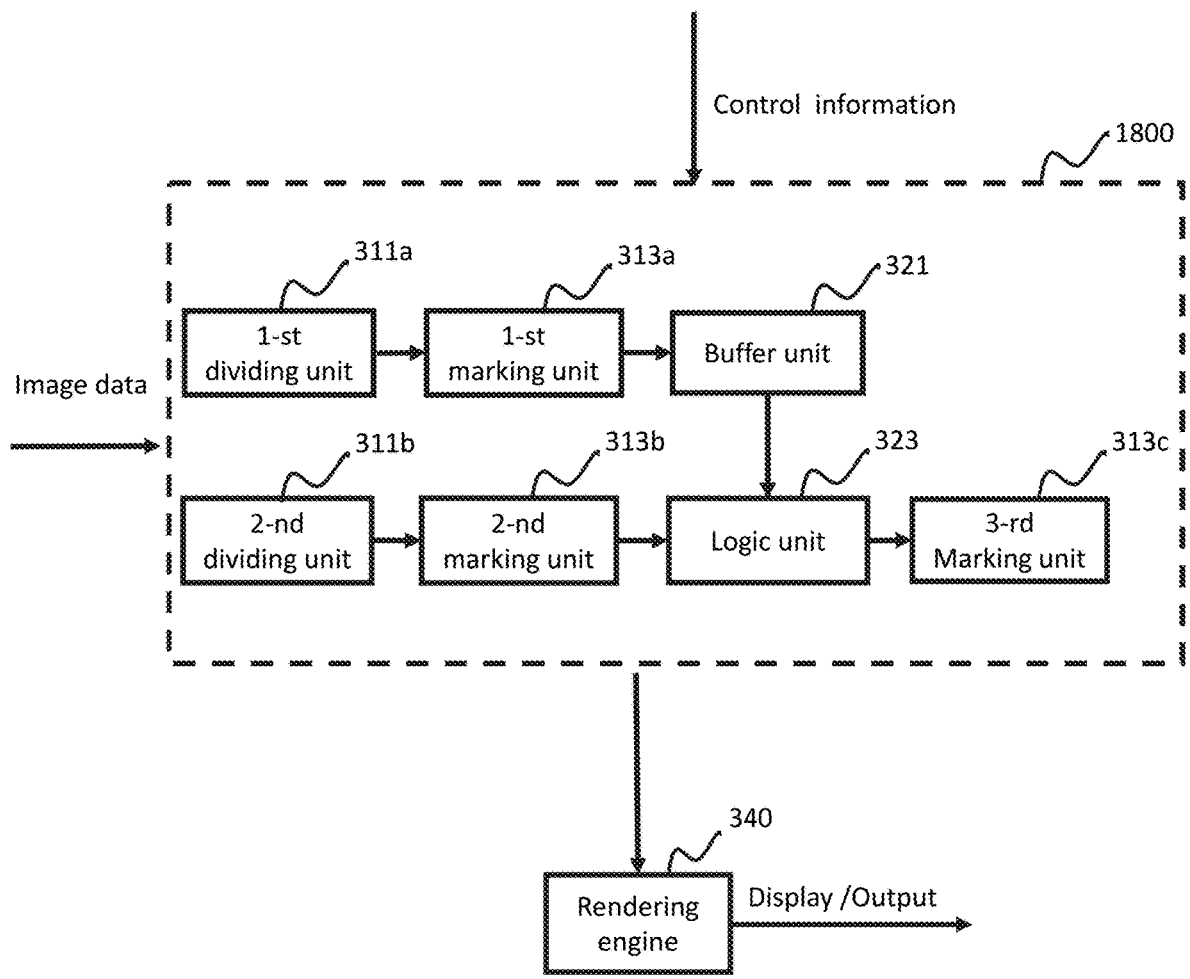
FIG. 18 is a block diagram illustrating an architecture of an image register engine, according to some embodiments of the present disclosure.

FIG. 18 is a block diagram illustrating an architecture of an image register engine, according to some embodiments of the present disclosure. Image register engine 1800 may be configured to register a first image data and a second image data. The first image data and the second image data may be captured by the same device or different devices. Merely by way of example, the first image data may be captured by MRI, and the second image data may be captured by CT. The first image data and the second image data may be captured at the same time or not. Merely by way of example, the first image data is captured in real time, and the second image data is pre-stored in a storage space. The first image data and the second image data may be about the same object, or they may refer to different parts of a same object, with at least an overlap. The description of the first image data and the second image data above is provided for illustration purposes, and not intended to limit the scope of the present disclosure.

The image register engine 1800 may include one or more dividing unit 311, one or more marking unit 313, one or more buffer unit 322, and one or more logic unit 323. The connection methods of the dividing unit 311, marking unit 313, buffer unit 322 and logic unit 323 may be by wire or wireless. Merely by a way of example, the image register engine 1800 may include two dividing unit 311a and 311b, three marking units 313a, 313b and 313c, a buffer unit 321 and a logic unit 323. The image register engine 1800 receives control information, the first image data and the second image data form other devices, and the image register engine 1800 performs operation of registering. The result will be displayed or output after being rendered by the rendering engine 340.

The first dividing unit 311a may be configured for dividing the first image data. The second dividing unit 311b may be configured for dividing the second image data. The dividing method used by dividing unit 311a and dividing unit 311b may be different. Merely by way of example, the method used by dividing unit 311a and dividing unit 311b are both Octree Split-and-Merge algorithm. As another example, the method used by dividing unit 311a is Octree Split-and-Merge algorithm and the method used by dividing unit 311b is a k-dimensional tree algorithm.

The marking unit 313a may be configured for marking the first image data. The content marked by the marking unit 313a includes viewpoint information and registering region information due to the viewpoint. The marking unit 313b may be configured for marking the second image data. The content marked by the marking unit 313b includes viewpoint information and projection region information based on the viewpoint.

The buffer unit 321 may be configured for storing data from the marking unit 313a. The data stored in buffer unit 321 may include registering region information.

The logic unit 323 may be configured for performing the operation of testing. According to the result of the test, the marking unit 313c may mark the first image data and the second image data accordingly.

This description is intended to be illustrative, and not to limit the scope of the present disclosure. Many alternatives, modifications, and variations will be apparent to those ordinarily skilled in the art. The features, structures, methods, and other characteristics of exemplary embodiments described herein may be combined in various ways to obtain additional and/or alternative exemplary embodiments. Merely by way of example, there may be only one dividing unit 311 to process both the first image data and the second image data. As another example, there may be only one marking unit 313, and the marking unit 313 may be used in different steps. Similar modifications should fall within the metes and bounds of the present disclosure.

Figure 19:
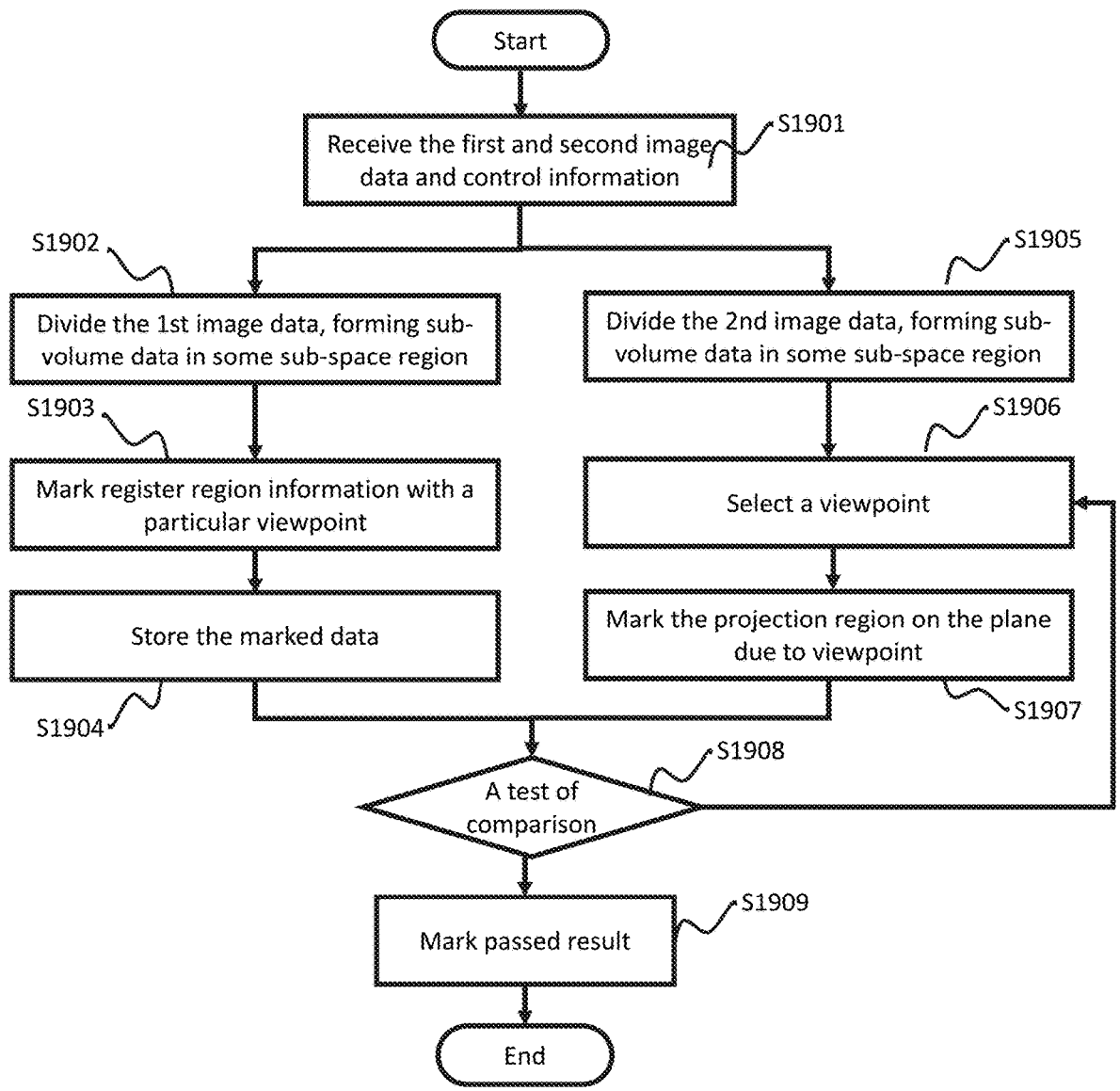
FIG. 19 is a flowchart of an exemplary process of image registering according to FIG. 0.18.

FIG. 19 is a flowchart of an exemplary process of image registering according to FIG. 18.

In step S1901, the first image data, the second image data and control information will be received. Next, in step S1902, the first image data may be divided into some sub-data in sub-space. At the same time, in step S1905, the second image data may be divided into some sub-data in sub-space.

The step S1903 is performed after step S1902. In step S1903 image data will be marked due to a particular viewpoint. The viewpoint may be selected randomly, or set by user/viewer. After the viewpoint is determined, the step S1904 may be performed.

The step S1906 is performed after step S1905. In step S1906, a plane related to another viewpoint will be generated. The viewpoint in step 1906 may be selected randomly, or from the control information, or set by user/viewer. In step S1907, the data marking of the second image may be based on the plane generated in step S1906.

A test of comparison will be performed in the step of S1908. If the test passes, a data mark processing may be performed in step S1909. If the test does not pass, a new viewpoint will be chosen in step S1906, and another plane would be determined. The loop involving steps S1906, S1907, S1908 will not end unless all the viewpoints of interest have been tested.

This description is intended to be illustrative, and not to limit the scope of the present disclosure. Many alternatives, modifications, and variations will be apparent to those ordinarily skilled in the art. The features, structures, methods, and other characteristics of the exemplary embodiments described herein may be combined in various ways to obtain additional and/or alternative exemplary embodiments. Merely by way of example, the control information may be obtained after step S1902. As another example, the process of the first image data and the second image data may be serial or parallel. Similar modifications should fall within the metes and bounds of the present disclosure.

Embodiment 3

Figure 20:
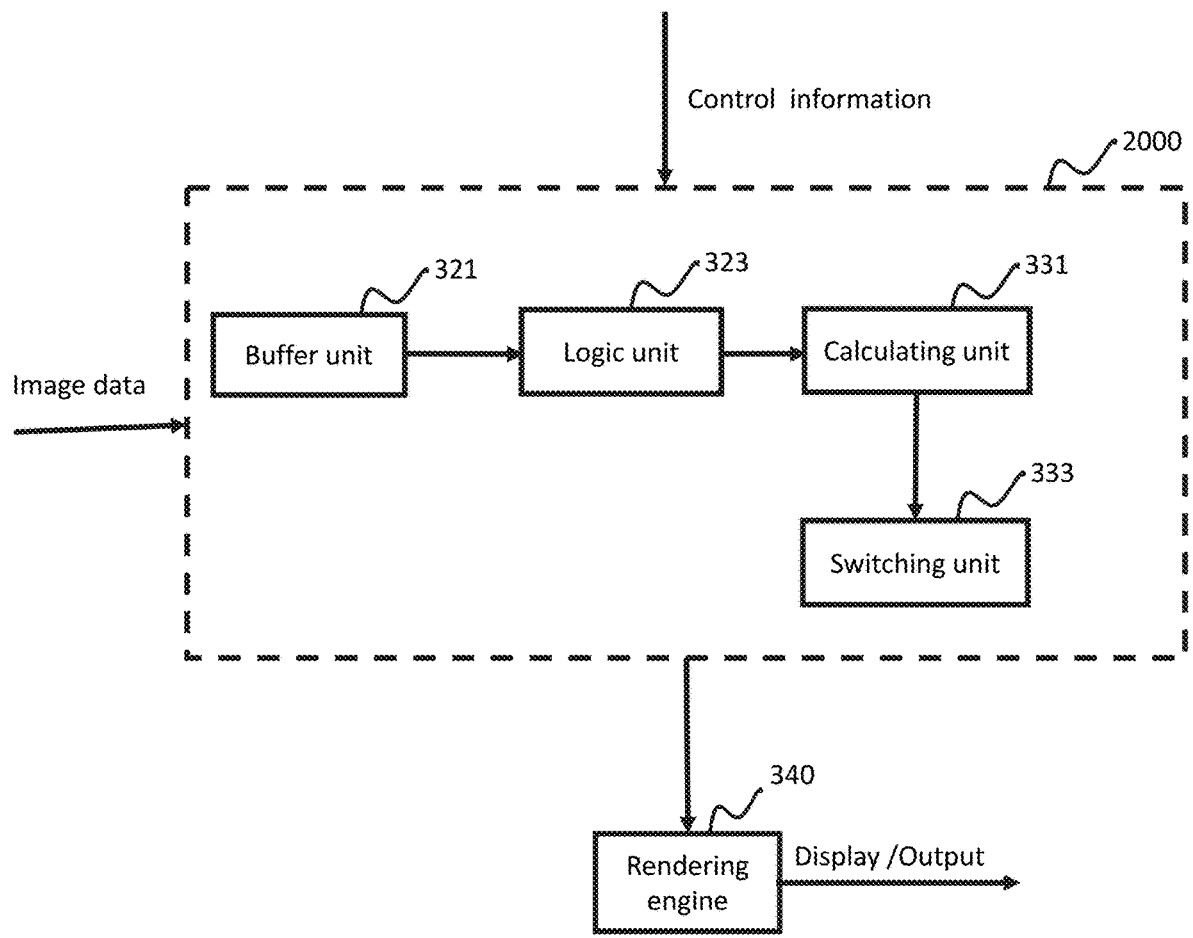
FIG. 20 illustrates the units in the ROI processing engine combined with the units in rendering engine based on sampling rate, to perform local magnification.

FIG. 20 illustrates the units in the ROI processing engine combined with the units in rendering engine based on sampling rate to perform the function of local magnification. The buffer unit 321 may be configured for storing stencil value of image data. The logic unit 323 may be configured for setting one or more reference value for control information, and comparing the stencil value with the reference value. The calculating unit 331 may be configured for calculating the actual sampling rate of the local image needed to be magnified based on the calculated feature parameter thereof and the map function. The switching unit 333 may be configured for adjusting the sampling rate to the actual sampling rate and switching the rendering method of the local image to a different image rendering method. The rendering engine 340 may be configured for performing rendering of the local image based on the actual sampling rate and to display the magnified local image.

Local magnification module 2000 may include one or more buffer unit 321, one or more logic unit 323, one or more calculating unit 331, one or more switching unit 333. The local magnification module 2000 may be configured for magnifying local image real-timely according to control information, which may be from internals and/or externals, such as region information drawn by the users, built-in region information, display information, or the information from the operation by the users. For example, when the user use mouse, a grid or other tags for identifying may be shown on the location of the mouse pointer, wherein the image under the grid or other tags may be magnified. The form and/or the size of the grid or other tags may be pre-set and the user could make choice there from. When the user use touch screen, if the placing of finger or any other objects on the screen was over a pre-set time, a region of the image near the finger or any other objects would be magnified. The pre-set time and the region of the image need to be magnified may be pre-set by the system and/or the user.

The above description of the illustration is intended to be illustrative, and not to limit the scope of the present disclosure. The features, structures, methods, and other characteristics of the exemplary embodiments described herein may be combined in various ways to obtain additional and/or alternative exemplary embodiments. Many alternatives, modifications, and variations will be apparent to those ordinarily skilled in the art. Those alternatives, modifications, and variations should fall within the metes and bounds of the present disclosure.

Figure 21:
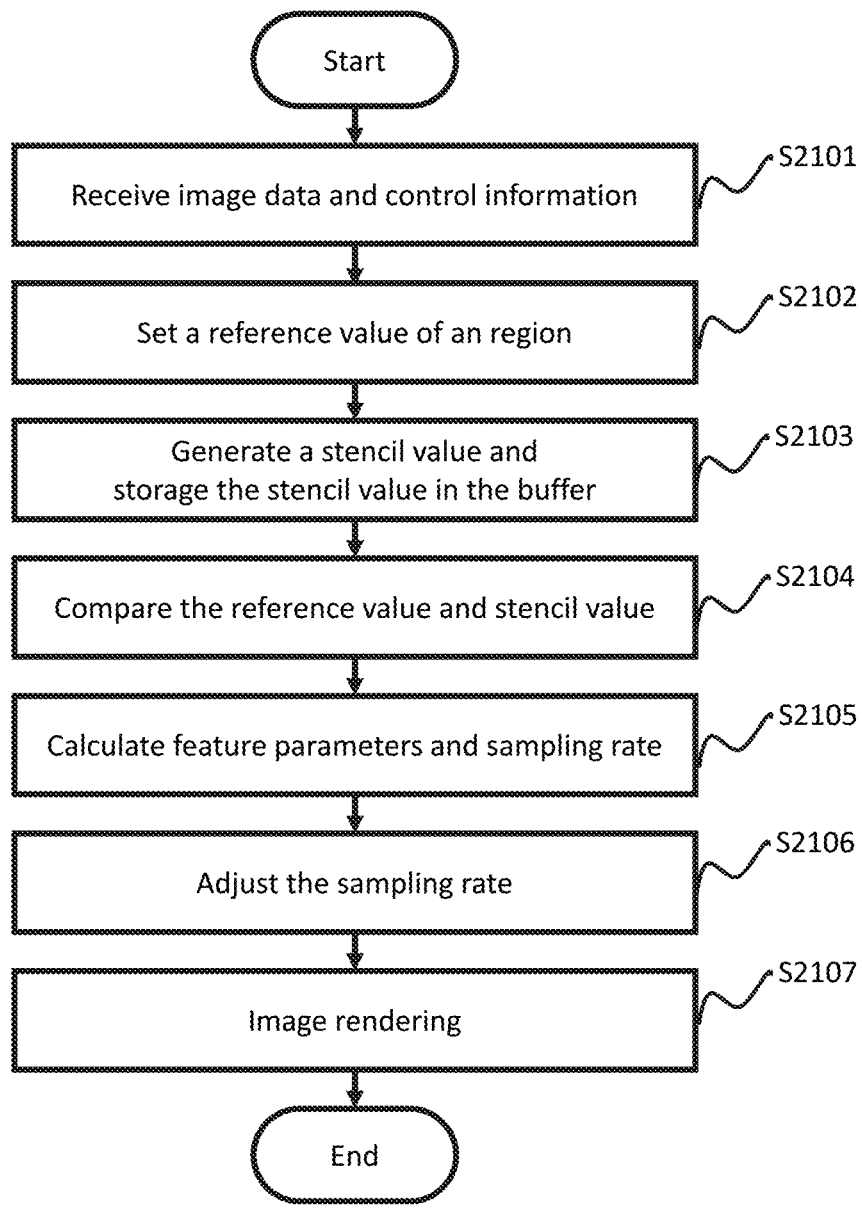
FIG. 21 is a flowchart to illustrate the process flow of the local magnification module 2000.

FIG. 21 is a flowchart to illustrate the process flow of the local magnification module 2000. More details will be shown in the following.

Receive image data, control information and region information in the step S2101, the control information and region information may be from internals and/or externals.

Set a reference value of each acquired region information in the step S2102, the reference value thereof may be same or different, which may determine to adopt the same or different rendering method.

Generate stencil value and store the stencil value in the buffer unit 321 in the step S2103.

Determine the rendering method adopted by different region information based on the test result of the reference value and the stencil value in the step S2104.

Calculate the actual sampling rate of the local image need to be magnified based on the calculated feature parameter thereof and the map function in the step S2105.

Switch the rendering method of the local image to a different image rendering method by the means of adjusting the sampling rate to the actual sampling rate and in the step S2106

Perform the rendering of the local image based on the actual sampling rate calculated in the step S2105 and display the magnified local image in the step S2107.

The above description of the steps are intended to be illustrative, and not to limit the scope of the present disclosure. Many alternatives, modifications, and variations will be apparent to those ordinarily skilled in the art. The features, structures, methods, and other characteristics of the exemplary embodiments described herein may be combined in various ways to obtain additional and/or alternative exemplary embodiments. For example, in the step S2103, the image data may be marked and put the value of markers in the buffer unit 321. In the step S2104, the rendering method of the different local image may be adopted based on the test result of the reference value and the stencil value. Similar alternatives, modifications, and variations should fall within the metes and bounds of the present disclosure.

Embodiment 4

Figure 22:
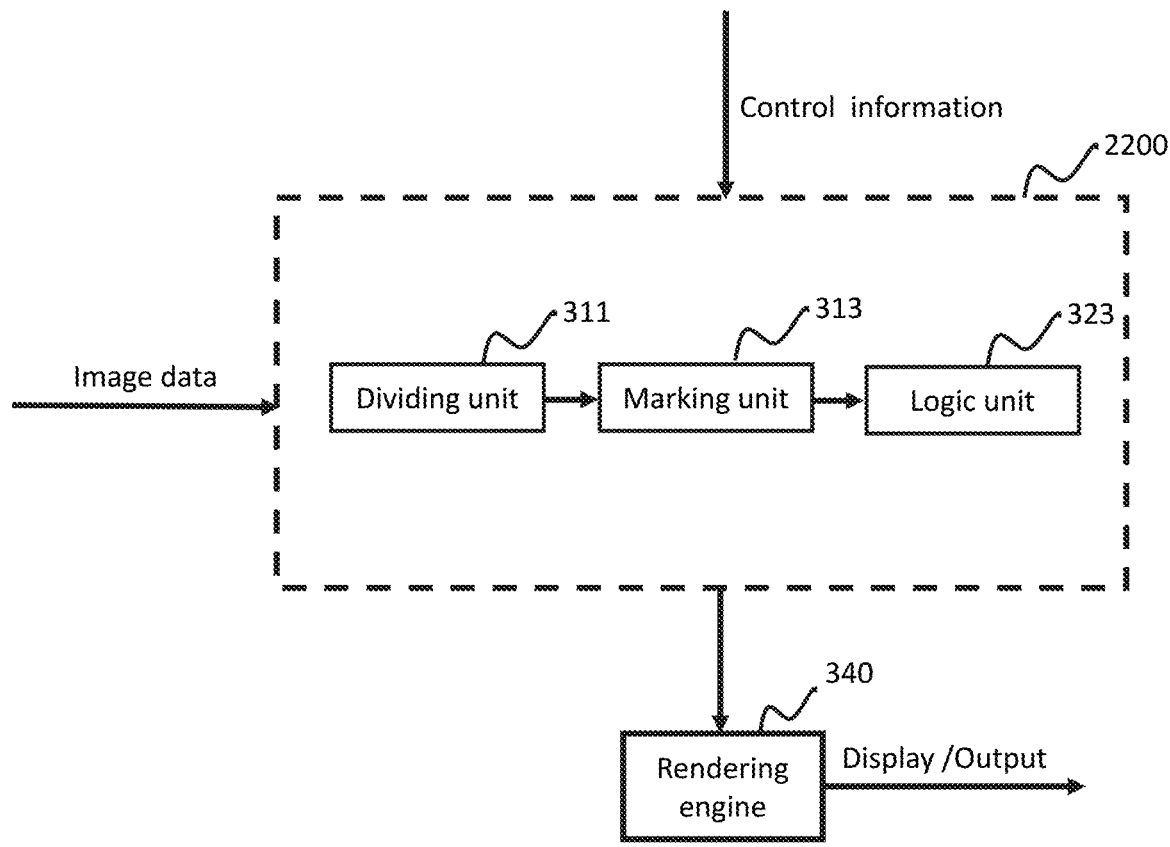
FIG. 22 is a block diagram illustrating an architecture of a rapid rendering engine, according to some embodiments of the present disclosure.

FIG. 22 is a block diagram illustrating an architecture of a rapid rendering engine, according to some embodiments of the present disclosure. The rapid rendering engine 2200 may be configured to render different parts of an object in different method. The rapid rendering engine 2200 may include one or more dividing unit 311, one or more marking unit 313, and one or more logic unit 323. The rapid rendering engine 2200 get control information and image data from other devices. The control information may be region information, or information about different rendering method of different regions.

The dividing unit 311 may be configured for dividing the image data. Merely by a way of example, the dividing unit 311 may divide a human body into different regions according to their density, depth, shape, the like, or any combination thereof. The marking unit 313 may be configured for marking the different regions. Merely by a way of example, mark a muscle with '000', and mark a blood vessel with '001'. Logic unit 323 may be configured for setting reference value for the different regions according to control information. Logic unit 323 may be configured for comparing reference value with the data marker, and different rendering method will be determined according to different test result.

This description is intended to be illustrative, and not to limit the scope of the present disclosure. Many alternatives, modifications, and variations will be apparent to those ordinarily skilled in the art. The features, structures, methods, and other characteristics of the exemplary embodiments described herein may be combined in various ways to obtain additional and/or alternative exemplary embodiments. Merely by way of example, a storage unit 322 may be used to store the result of the marking unit 313. Similar modifications should fall within the metes and bounds of the present disclosure.

Figure 23:
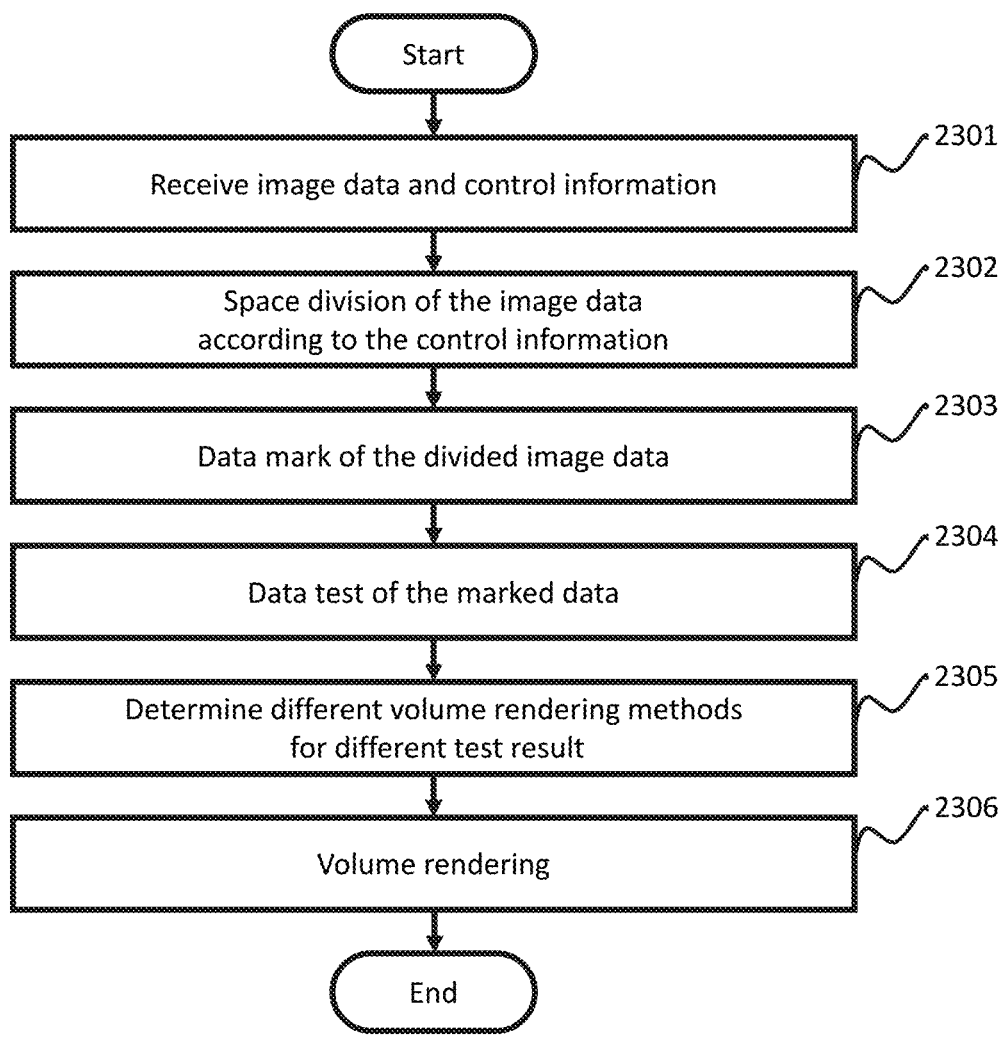
FIG. 23 is a flowchart of an exemplary process of rapid registering according to FIG. 22.

FIG. 23 a flowchart of an exemplary process of rapid registering according to FIG. 22. The steps of FIG. 23 include:

Step S2301, receive image data and control information. According to the control information, set reference value and rendering method of different regions.

Step S2302, divide the image data, forming different sub-data in different sub-region.

Step S2303, mark the divided image data. The data marker is mapped to the reference value.

Step S2304, perform the data test between the marked data and the reference value.

Step S2305, determine different volume rendering method for different test result.

Step S2306, perform the operation of volume rendering according to different method or strategy, and display and/or output the result.

This description is intended to be illustrative, and not to limit the scope of the present disclosure. Many alternatives, modifications, and variations will be apparent to those ordinarily skilled in the art. The features, structures, methods, and other characteristics of the exemplary embodiments described herein may be combined in various ways to obtain additional and/or alternative exemplary embodiments. Similar modifications should fall within the metes and bounds of the present disclosure.

Figure 24:
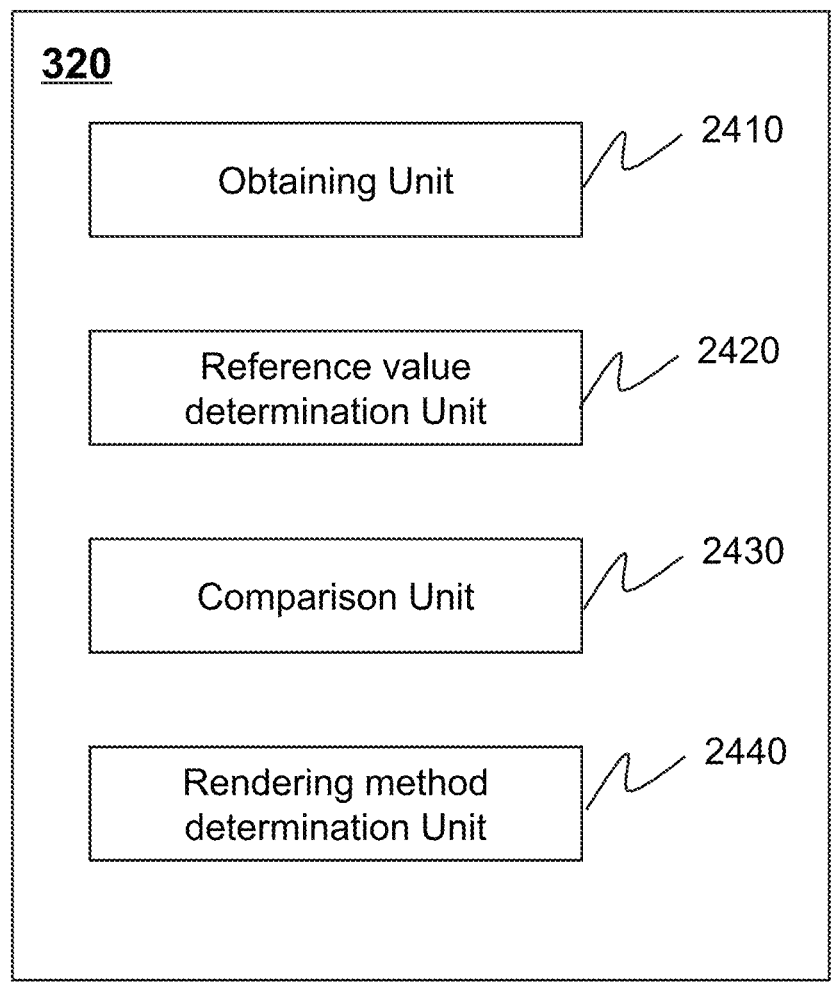
FIG. 24 shows another exemplary diagram of the ROI processing engine 320.

FIG. 24 shows another exemplary diagram of the ROI processing engine 320. The ROI processing engine 320 may be configured for determining rendering methods for various ROIs of an image. The image may be a three dimension (3D) image or a two dimension (2D) image. The ROI processing engine 320 may include an obtaining unit 2410, a reference value determination unit 2420, a comparison unit 2430, and a rendering method determination unit 2440. The ROI processing engine 320 may be operably connected with the rendering engine 340. The connections within the ROI processing engine 320, as well as the connection between the ROI processing engine 320 and the rendering engine 340, may be by wire or wireless.

The obtaining unit 2410 may be configured to obtain image data of an image and information about regions of interest (ROIs) of the image from the image data acquisition module 201 or the image storage module 204. The image data may be medical image data, atmosphere stereo image data, or geological layer image data. The image may include a 3D image or a 2D image. For convenience, the following descriptions are provided with reference to pixels of a 2D image unless otherwise stated. It is understood that this is for illustration purposes only and not intended to be limiting. The method and system described herein are applicable to process a 3D image.

A pixel of the image may include a pixel value and position information of the pixel. The position information may include coordinates of the pixel in a coordinate system. For example, the coordinate system may include a Cartesian coordinate system having an origin located at any pixel of the image, such as a vertex pixel of the image or a center pixel of the image. In some embodiments, each voxel of a 3D image may have a depth value. The depth value of a voxel may indicate position information along a direction perpendicular to a plane on which the 3D image is projected and/or displayed. The 3D image may be projected to the plane for displaying on a screen. The image data, e.g., the voxels of the image, may be projected onto the plane along the direction perpendicular to the plane. For example, the 3D image may be projected onto the x-y plane for display on a screen. The depth value of a voxel having a coordinate (x, y, z) may be the value of z.

In some embodiments, the image may include one or more ROIs. The information about an ROI may be obtained through an external device or the internal image processing system. Merely by way of example, the boundary of an ROI may be specified by a user using a mouse, a keyboard, or a finger on the screen, or the like, or any combination thereof. For example, a region of interest may relate to the shape of a lesion or organ exhibited in a medical image. The region of interest may be set by delineating a portion of an image by a user using a mouse, a keyboard, via a touchscreen or a somatosensory device, or the like, or any combination thereof. In some embodiments, the one or more ROIs may be segmented using one or more of various segmentation methods, or using the process described elsewhere in the present disclosure at, e.g., FIGS. 6 and 7, and the description thereof.

For example, the image may be a medical image of a patient, and may include multiple ROIs such as a bone area, a vein area, a lung, the heart, or a region defined by a user, or the like, or any combination thereof. After segmentation, each ROI may be marked to be distinguished from other parts of the image. For example, each pixel in the same ROI may be assigned a same stencil value. The stencil values of pixels in different ROIs may be different. In some embodiments, different ROIs may be segmented by the image cutting engine 310 and the image cutting engine 310 or the ROI processing engine 320 may assign pixels of one ROI of the image a stencil value. In some embodiments, the pixels not belong to any ROIs may be assigned a stencil value of 0, or not assigned a stencil value.

In some embodiments, the stencil values may be set by a user. For example, when the image is segmented, the user may assign each segmented ROI a stencil value, and the ROI processing engine 320 may set pixels in the ROI with the stencil value the user has assigned. In some embodiments, the stencil values may be set automatically. For example, when the image is segmented, the ROI processing engine 320 may assign pixels in the first segmented ROI with a first stencil value, such as 1, and assign pixels in the second segmented ROI with a second stencil value, such as 2, or the like. Each stencil value may correspond to an ROI.

The reference value determination unit 2420 may be configured to determine one or more reference values. A reference value may be used to select a specific ROI from the one or more ROIs of the image for rendering and/or displaying on a screen such as the image display module 205. The reference value may be determined according to a user input. In some embodiments, the reference value determination unit 2420 may determine the reference value based on the user input. For example, the user may need or desire to observe an ROI such as the heart of a patient, and the user may know or assign the stencil value of pixels in the ROI of the heart, for example, 1, then the user may input the reference value of 1. In some embodiments, each of the stencil values of the image may correspond to a marker such as a keyword. For example, the stencil value of pixels of the heart may be 1, and may correspond to a keyword "heart." When the user needs or desires to observe the heart, the user may input the word "heart," instead of memorizing and/or inputting the stencil value of the heart, and the reference value determination unit 2420 may determine the reference value as 1.

In some embodiments, the reference value determination unit 2420 may determine the reference value based on one or more pixels selected by a user. For example, the user may need or desire to observe an ROI such as the heart of a patient, and the user does not know the stencil value of pixels in the ROI of the heart. The user may select a pixel of the heart of the image displayed on a screen, and the reference value determination unit 2420 may determine the stencil value of the selected pixel as the reference value. In some embodiments, the user may select the pixel using an input device such as a mouse, a keyboard, a touchscreen, a somatosensory device, or the like, or any combination thereof. In some embodiments, the screen may include a touchscreen, and the user may select a pixel directly by touching the pixel on the touchscreen.

In some embodiments, the user may input one or more reference values, or the user may select one or more pixels in different ROIs using an input device such as a mouse, a keyboard, a touchscreen, a somatosensory device, or the like, or any combination thereof. The reference value determination unit 2420 may determine one or more reference values according to the user input or the selected one or more pixels. For example, the reference value determination unit 2420 may determine a first stencil value of a first pixel of the one or more pixels as a first reference value, and determine a second stencil value of a second pixel of the one or more pixels as a second reference value, or the like.

In some embodiments, the user may select a region in the image displayed on a screen using an input device such as a mouse, a keyboard, a touchscreen, a somatosensory device, or the like, or any combination thereof. The reference value determination unit 2420 may determine one or more reference values according to pixels in the selected region of the image. For example, the selected region may include one or more pixels having different stencil values, and the reference value determination unit 2420 may determine a first stencil value of a pixel of the one or more pixels as a first reference value, and determine a second stencil value of a second pixel of the one or more pixels as a second reference value, or the like.

In some embodiments, the reference value determination unit 2420 may further determine one or more reference depth values according to the user or automatically. In some embodiments, the user or the system may assign one or more reference depth values, each corresponding to different coordinates of the plane.

The comparison unit 2430 may be configured to determine or select an ROI from the one or more ROIs of the image based on the reference value and the stencil values of pixels of the image. The comparison unit 2430 may compare the stencil values of pixels of the image with the reference value, and determine a first ROI including pixels whose stencil values satisfy a condition, e.g., being equal to the reference value. In some embodiments, for each reference value, the comparison unit 2430 may compare the stencil value of each pixel of the image with the reference value.

In some embodiments, for a 3D image, the comparison unit 2430 may further compare the reference depth value and the depth value of the voxel and determine an updated ROI based on the comparison. For example, the comparison unit 2430 may identify voxels whose depth values are equal to the reference depth value as the updated ROI.

The rendering method determination unit 2440 may be configured to determine or select a rendering method for an ROI from various rendering methods. Exemplary rendering methods may include volume rendering, MIP (Maximum Intensity Projection) rendering, Minimum Intensity Projection rendering, Average rendering, Multi-Planner Reformation rendering, Shaded Surface rendering, Digital Reconstruction Radiography rendering, the like, or any combination thereof. The rendering may also differ in some aspects of the image rendering, such as color rendering, depth rendering, diaphaneity rendering, alpha rendering, the like, or any combination thereof. The selection of a rendering method may be performed manually or semi-manually based at least in part on a user input or automatically by the system. For example, the user may specify MIP rendering for rendering an updated ROI of the image. In some embodiments, the rendering method determination unit 2440 may determine, based on a user input or automatically, the rendering method for the selected ROI, and determine an alternative rendering method for other parts (e.g., other ROIs or a region other than an ROI) of the image. For example, the rendering method determination unit 2440 may determine to render the selected ROI using a first color, such as red, and render other parts of the image using a second color other than the first color, such as grey. In some embodiments, the rendering method determination unit 2440 may determine that such other parts of the image other than an ROI not be rendered and/or displayed.

In some embodiments, the rendering method determination unit 2440 may determine a rendering method for each of the multiple selected ROIs. In some embodiments, the rendering methods of at least two of the selected ROIs may be different or the same. For example, the rendering method determination unit 2440 may determine to render a first selected ROI using a first color, such as red, render a second selected ROI using a second color, such as blue, and render the remaining parts of the image using a third color other than the first and the second colors, such as grey. In some embodiments, the rendering method determination unit 2440 may determine that the remaining parts of the image other than the first ROI and the second ROI not be rendered and/or displayed. In some embodiments, the user may set the rendering method for a selected ROI. For example, the user may set a first color for the selected ROI, and set a second color for other parts of the image.

The description of the exemplary embodiments herein is intended to be illustrative, and not to limit the scope of the present disclosure. Many alternatives, modifications, and variations will be apparent to those ordinarily skilled in the art. The features, structures, methods, and other characteristics of the exemplary embodiments described herein may be combined in various ways to obtain additional and/or alternative exemplary embodiments.

Figure 25:
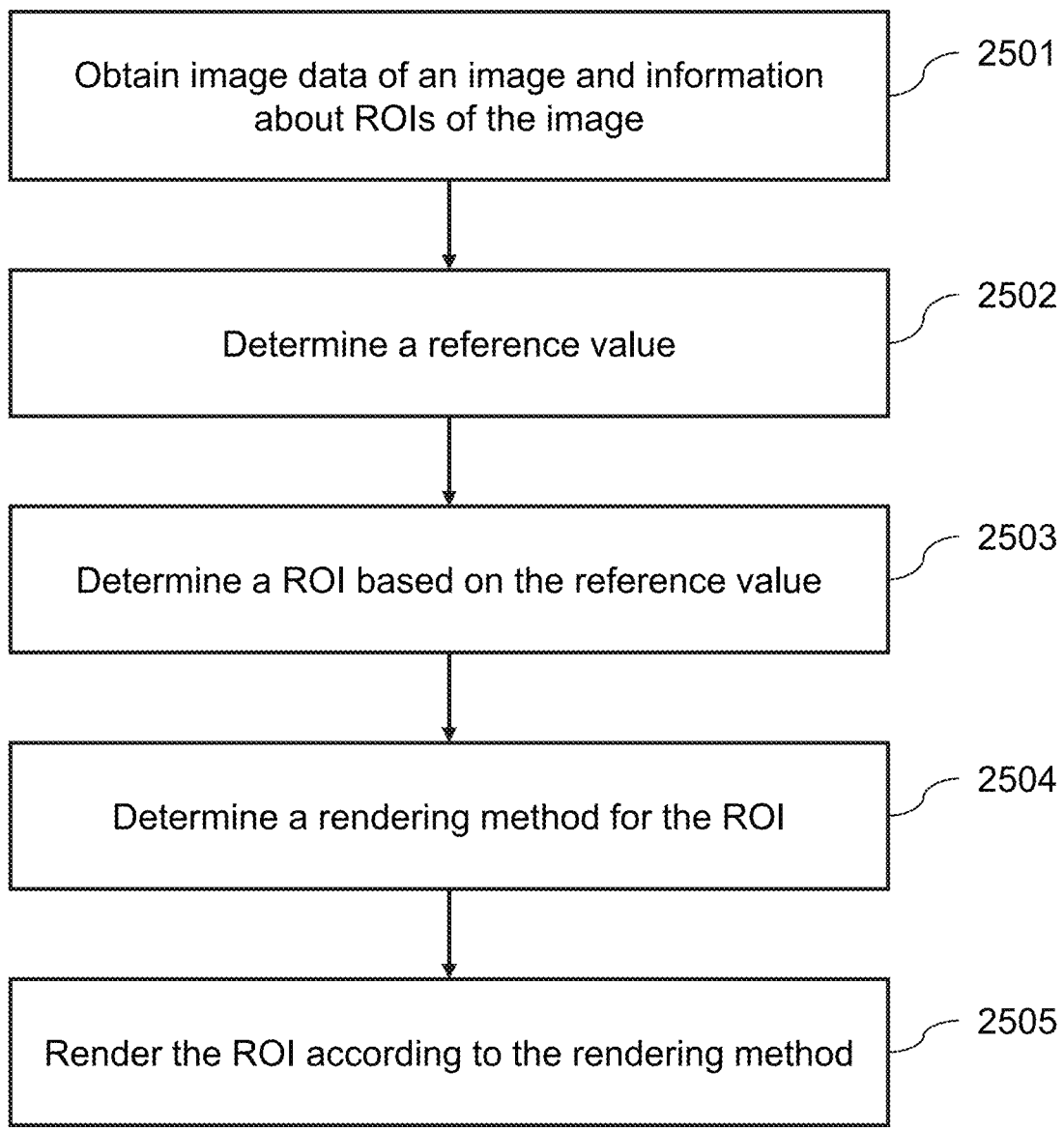
FIG. 25 is a flow chart showing an exemplary process of rendering various ROIs using different rendering methods according to some embodiment of the present disclosure.

FIG. 25 is a flowchart showing an exemplary process of rendering various ROIs using different rendering methods according to some embodiment of the present disclosure. The process 2500 may be executed by the ROI processing engine 320. For example, the process 2500 may be implemented as a set of instructions stored in the storage device 103. The units 2410-2440 illustrated in FIG. 24 may execute the set of instructions, and when executing the instructions, it may be configured to perform the process 2500. The operations of the process 2500 presented below are intended to be illustrative. In some embodiments, the process 2500 may be accomplished with one or more additional operations not described and/or without one or more of the operations discussed. Additionally, the order in which the operations of the process illustrated in FIG. 25 and described below is not intended to be limiting. In some embodiments, at least part of the operation S1705 of the process illustrated in FIG. 17, operations S2304 and S2305 of the process illustrated in FIG. 23 may be performed according to the process 2500.

In 2501, the obtaining unit 2410 may obtain image data of an image and information about ROIs of the image. The image may be obtained from the image data acquisition module 201 or the image storage module 204. The image data may be medical image data, atmosphere stereo image data or geological layer image data. The image may include a 3D image or a 2D image. A pixel of the image may include a pixel value and position information of the pixel. In some embodiments, the image may include one or more ROIs. An ROI may relate to the shape of a lesion or organ exhibited in a medical image. The region of interest may be set by delineating a portion of an image by a user using a mouse, a keyboard, via a touchscreen or somatosensory device, the like, or any combination thereof. In some embodiments, the one or more ROIs may be segmented using one or more of various segmentation methods, or using the process described elsewhere in the present disclosure at, e.g., FIGS. 6 and 7 and the description thereof.

For example, the image may be a medical image of a patient, and may include multiple ROIs such as a bone area, a vein area, a lung, the heart, or a region defined by a user, or the like, or any combination thereof. After segmentation, each ROI may be marked to be distinguished from other parts of the image. For example, each pixel in the same ROI may be assigned a same stencil value. The stencil values of pixels in different ROIs may be different. In some embodiments, different ROIs may be segmented by the image cutting engine 310, and the image cutting engine 310 or the ROI processing engine 320 may assign pixels of one ROI of the image a stencil value. In some embodiments, the pixels not belong to any ROIs may be assigned a stencil value of 0, or not assigned a stencil value.

In some embodiments, the stencil values may be set by a user. For example, when the image is segmented, the user may assign each segmented ROI a stencil value, and the ROI processing engine 320 may set pixels in the ROI with the stencil value the user has assigned. In some embodiments, the stencil values may be set automatically. For example, when the image is segmented, the image cutting engine 310 may assign pixels in the first segmented ROI with a first stencil value, such as 1, and assign pixels in the second segmented ROI with a second stencil value, such as 2, or the like. Each stencil value may correspond to an ROI.

In some embodiments, the ROI may be any shape in the image. For convenience, FIG. 11 illustrates two ROIs labeled as 1 and 2. The pixels in ROI 1 may be assigned a stencil value of 1. The pixels in ROI 2 may be assigned a stencil value of 2. The pixels in other parts of the image other than ROIs 1 and 2 may be assigned a stencil value of 0.

In 2502, the reference value determination unit 2420 may determine a reference value. A reference value may be used to select a specific ROI from the one or more ROIs of the image for rendering and/or displaying on a screen. The reference value may be determined according to a user input. In some embodiments, the reference value determination unit 2420 may determine the reference value based on the user input. For example, the user may need or desire to observe an ROI such as the heart of a patient, and the user may know the stencil value of pixels in the ROI of the heart, for example, 1, then the user may input the reference value of 1. In some embodiments, each of the stencil values of the image may correspond to a marker such as a keyword. For example, the stencil value of pixels of the heart may be 1, and may correspond to a keyword "heart." When the user needs or desires to observe the heart, the user may input the word "heart," instead of memorizing and/or inputting the stencil value of the heart, and the reference value determination unit 2420 may determine the reference value as 1.

In some embodiments, the reference value determination unit 2420 may determine the reference value based on one or more pixels selected by a user. For example, the user may need or desire to observe an ROI such as the heart of a patient, and the user does not know the stencil value of pixels in the ROI of the heart. The user may select a pixel of the heart of the image displayed on a screen, and the reference value determination unit 2420 may identify the pixel selected by the user and designate the stencil value of the selected pixel as the reference value. In some embodiments, the user may select the pixel using a mouse. In some embodiments, the screen may include a touch screen and the user may select the pixel directly by touching the pixel on the touch screen.

In some embodiments, the user may input one or more reference values, or the user may select one or more pixels in different ROIs. The reference value determination unit 2420 may determine one or more reference values according to the user input or the selected one or more pixels. For example, the reference value determination unit 2420 may determine a first stencil value of a first pixel of the one or more pixels as a first reference value, and determine a second stencil value of a second pixel of the one or more pixels as a second reference value, or the like.

In some embodiments, the user may select a region in the image displayed on a screen, and the reference value determination unit 2420 may determine one or more reference values according to pixels in the selected region of the image. For example, the selected region may include one or more pixels having different stencil values, and the reference value determination unit 2420 may determine a first stencil value of a first pixel of the one or more pixels as a first reference value, and determine a second stencil value of a second pixel of the one or more pixels as a second reference value, or the like.

In 2503, the comparison unit 2430 may determine an ROI based on the reference value and the stencil values of pixels of the image. The comparison unit 2430 may compare the stencil values of pixels of the image with the reference value, and determine a first ROI including pixels whose stencil values satisfy a condition, e.g., being equal to the reference value. In some embodiments, for each reference value of one or more reference values, the comparison unit 2430 may compare the stencil value of each pixel of the image with the reference value, and determine one or more ROIs corresponding to the one or more reference values. In some embodiments, for each reference value of one or more reference values, the comparison unit 2430 may compare the stencil value of a part of pixels of the image with the reference value, and determine one or more ROIs corresponding to the one or more reference values. For example, the pixels that have been compared and determined with a stencil value equal to other reference values may not need to be compared with the reference value.

In 2504, the rendering method determination unit 2440 may further determine a rendering method for the ROI from various rendering methods. Exemplary rendering methods may include volume rendering, MIP (Maximum Intensity Projection) rendering, Minimum Intensity Projection rendering, Average rendering, Multi-Planner Reformation rendering, Shaded Surface rendering, Digital Reconstruction Radiography rendering, the like, or any combination thereof. The rendering may also differ in some aspects of the image rendering, such as color rendering, depth rendering, diaphaneity rendering, alpha rendering, the like, or any combination thereof. The selection of a rendering method may be performed manually or semi-manually based at least in part on a user input or automatically by the system. For example, the user may specify MIP rendering for rendering the ROI of the image. In some embodiments, the rendering method determination unit 2440 may determine the rendering method, based on a user input or automatically, for the determined ROI, and determine an alternative rendering method for other parts (e.g., other ROIs or a region other than an ROI) of the image. For example, the rendering method determination unit 2440 may determine to render the determined ROI using a first color, such as red, and render other parts of the image using a second color other than the first color, such as grey. In some embodiments, the rendering method determination unit 2440 may determine that such other parts of the image other than an ROI not be rendered and/or displayed.

In some embodiments, the comparison unit 2430 may determine multiple ROIs in 2503, and the rendering method determination unit 2440 may determine a rendering method for each of the multiple determined ROIs. In some embodiments, the rendering methods of at least two of the multiple ROIs may be different or the same. For example, the rendering method determination unit 2440 may determine to render a first ROI of the multiple ROIs using a first color, such as red, render a second ROI of the multiple ROIs using a second color, such as blue, and render the remaining parts of the image using a third color other than the first and the second colors, such as grey. In some embodiments, the rendering method determination unit 2440 may determine that the remaining parts of the image other than the first ROI and the second ROI not be rendered and/or displayed. In some embodiments, the user may determine the rendering method for a determined ROI. For example, the user may determine a first color for the determined ROI, and determine a second color for other parts of the image.

As illustrated in FIG. 11, when ROI 1 is rendered, the reference value may be set as 1 and compared with the stencil values of pixels of the image. If the stencil value is equal to the reference value, the corresponding pixel may be rendered using the rendering method corresponding to ROI 1. When ROI 2 is rendered, the reference value may be set as 2 and compared with the stencil values of pixels of the image. If the stencil value is equal to the reference value, then the corresponding pixel may be rendered using the rendering method corresponding to ROI 2. Finally when the background region other than ROIs 1 and 2 are rendered, the reference value may be set as 0 and compared with the stencil values of pixels of the image. If the stencil value is equal to the reference value, the corresponding pixel may be rendered using the rendering method corresponding to the background region other than ROIs 1 and 2.

In 2505, the rendering engine 340 may render an ROI of the image according to the determined rendering method. In some embodiments, the rendering engine 340 may render some or all selected ROIs using corresponding rendering methods and display the rendered ROI(s) on a screen, such as the image display module 205. In some embodiments, the rendering engine 340 may render the total or entire image and display the image on the screen. When an image is displayed on the screen, the displayed image on the screen may be referred to as a "screen image" of the image. The scaling factor between the screen image and total image may indicate a display scale of the screen image relative to the image. For example, a 2D image may have a resolution of 100*100. When the 2D image is displayed on the screen, the displayed screen image may have a resolution of 100*100 by default. In some embodiments, the user may expand the displayed screen image to a resolution of 200*200 by, e.g., performing an expanding operation. However, the image itself is also an image having a resolution of 100*100, while the screen image having a resolution of 200*200. In such a situation, the display scale of the screen image relative to the image may be (200*200)/(100*100), i.e., 4.

The ratio of visible regions between the screen image and the total image may indicate the display scale of the visible region of the screen image relative to the total screen image. Using the above example, the screen may be an LCD having a resolution of 150*150, so when the image is displayed on the LCD by default, the visible region of the screen image may be 100*100, and the total screen image is 100*100, so the display scale of the visible region of the screen image relative to the total screen image may be (100*100)/(100*100), i.e., 1. In some embodiments, the user may expand the displayed screen image to a resolution of 200*200 by, e.g., performing an expanding operation. The visible region of the screen image may be 150*150 due to the resolution of the LCD, and the total screen image is become 200*200 now, so the display scale of the visible region of the screen image relative to the total screen image may be (150*150)/(200*200), i.e., 0.5625.

The rendering engine 340 may further perform post processing to the ROI of the image or the other parts of the image. The post processing may include displaying, operating on the image from users, operating on the image from another module in the image processing system, the like, or any combination thereof. The displaying processing may include sub-screen displaying, contrast displaying, amplification displaying, or the like, or any combination thereof. In some embodiments, the sub-screen displaying may include divide the screen into multiple regions. A first region of the multiple regions may display a first ROI of the image using a first rendering method, and a second region of the multiple regions may display a second ROI of the image using a second rendering method. In some embodiments, a first region of the multiple regions may display a first ROI of the image using a first rendering method and the other parts of the image using a third rendering method, and a second region of the multiple regions may display a second ROI of the image using a second rendering method and the other parts of the image using the third rendering method. The operation on the image may include cutting, magnifying, window adjusting, rotating, processing batch, the like, or any combination thereof. The operation on the image from another module may include generating an image mosaic, 3-D cutting, volume rendering, and so on.

In some embodiments, the post processing may include adjust a sampling rate of the image, and update the rendering method based on the sampling rate. Description of the post processing may be found elsewhere in the present application, e.g., FIGS. 13-15 and the description thereof.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a storing operation) may be added elsewhere in the process 2500. In the storing operation, the units of the ROI processing engine 320 may store information and/or data associated with the image, the ROI, and the rendering method in the storage device described elsewhere in the present disclosure. In some embodiments, operations 2503 and 2504 may be combined.

Figure 26:
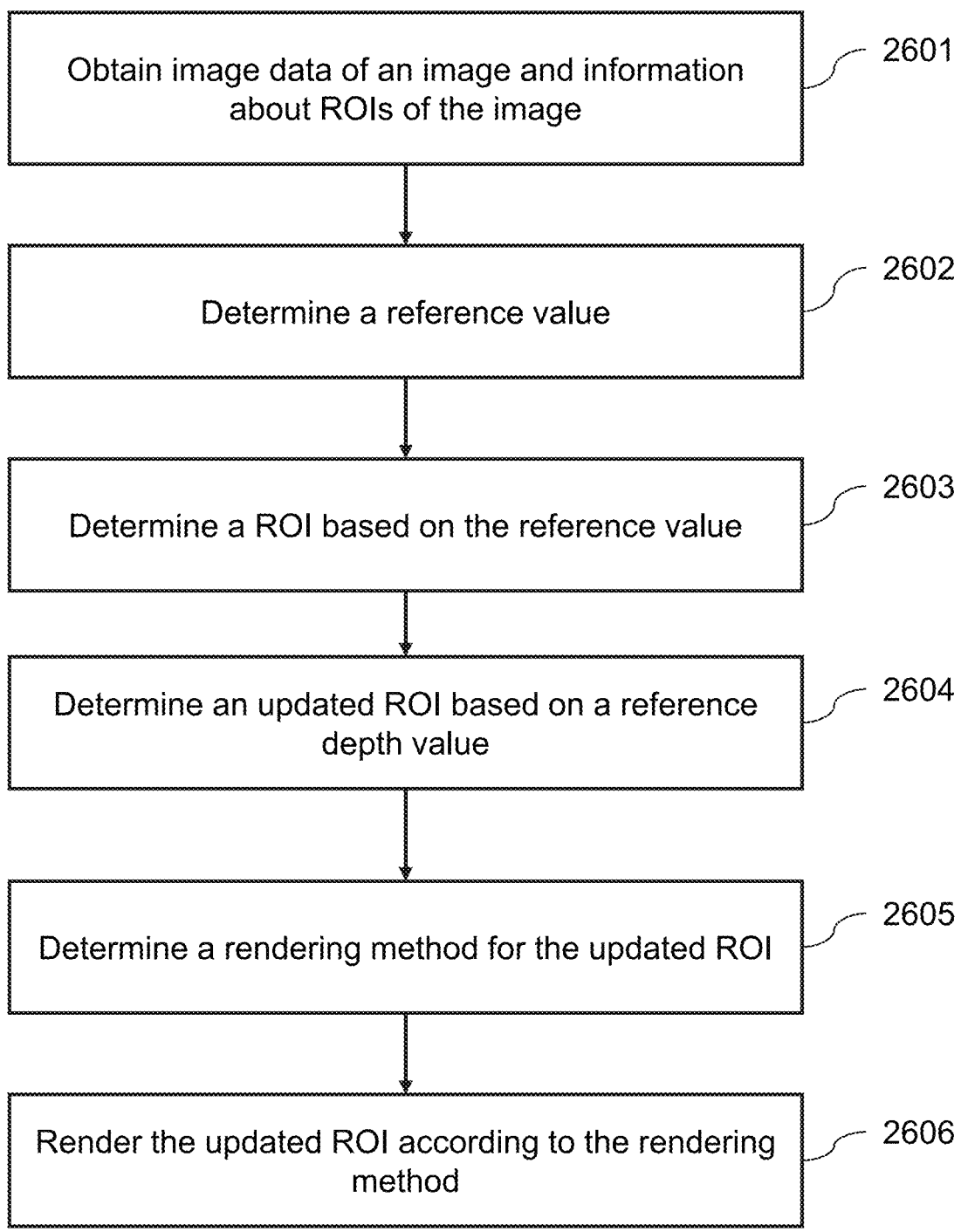
FIG. 26 shows another exemplary flowchart showing an exemplary process of rendering various ROIs using different rendering methods according to some embodiment of the present disclosure.

FIG. 26 is another exemplary flowchart showing an exemplary process of rendering various ROIs using different rendering methods according to some embodiment of the present disclosure. The process 2600 may be executed by the ROI processing engine 320. For example, the process 2600 may be implemented as a set of instructions stored in the storage device 103. The units 2410-2440 illustrated in FIG. 24 may execute the set of instructions, and when executing the instructions, it may be configured to perform the process 2600. The operations of the process 2600 presented below are intended to be illustrative. In some embodiments, the process 2600 may be accomplished with one or more additional operations not described and/or without one or more of the operations discussed. Additionally, the order in which the operations of the process illustrated in FIG. 26 and described below is not intended to be limiting. In some embodiments, at least part of the operation S1705 of the process illustrated in FIG. 17, operations S2304 and S2305 of the process illustrated in FIG. 23 may be performed according to the process 2600.

In 2601, the obtaining unit 2410 may obtain image data of an image and information about regions of interest (ROIs) of the image. The image may be obtained from the image data acquisition module 201 or the image storage module 204. The image data may be medical image data, atmosphere stereo image data, or geological layer image data. The image may include a 3D image including a plurality of voxels, and each voxel of the image may include a voxel value and position information of the voxel. The position information may include coordinates of the voxel in a coordinate system. For example, the coordinate system may include a Cartesian coordinate system having an origin located at any voxel of the 3D image, such as a vertex voxel of the image or a center voxel of the image. In some embodiments, each voxel of the 3D image may have a depth value. The depth value of a voxel may indicate position information along a direction perpendicular to a plane on which the 3D image is projected and/or displayed. The 3D image may be projected to the plane for displaying on the screen. The image data, e.g., the voxels of the image, may be projected onto the plane along a direction perpendicular to the plane. For example, the 3D image may be projected onto the x-y plane for display on a screen. A voxel having a coordinate (x, y, z) may have a depth value of z.

In some embodiments, the image may include one or more ROIs. An ROI may relate to the shape of a lesion or organ exhibited in a medical image. The region of interest may be set by delineating a portion of an image by a user using a mouse, a keyboard, via a touchscreen or somatosensory device, the like, or any combination thereof. In some embodiments, the one or more ROIs may be segmented using one or more of various segmentation methods, or using the process described elsewhere in the present disclosure at, e.g., FIGS. 6 and 7 and the description thereof.

For example, the image may be a medical image of a patient, and may include multiple ROIs such as a bone area, a vein area, a lung, the heart, or a region defined by a user, or the like, or any combination thereof. After segmentation, each ROI may be marked to be distinguished from other parts of the image. For example, each voxel in the same ROI may be assigned a same stencil value. The stencil values of voxels in different ROIs may be different. In some embodiments, different ROIs may be segmented by the image cutting engine 310, and the image cutting engine 310 or the ROI processing engine 320 may assign voxels of the image a stencil value. In some embodiments, the voxels not belong to any ROIs may be assigned a stencil value of 0, or not assigned a stencil value.

In some embodiments, the stencil values may be set by a user. For example, when the image is segmented, the user may assign each segmented ROI a stencil value, and the ROI processing engine 320 may assign voxels in the ROI with the stencil value the user has assigned. In some embodiments, the stencil values may be set automatically. For example, when the image is segmented, the image cutting engine 310 or the ROI processing engine 320 may assign voxels in the first segmented ROI with a first stencil value, such as 1, and assign voxels in the second segmented ROI with a second stencil value, such as 2, or the like. Each stencil value may correspond to an ROI.

In 2602, the reference value determination unit 2420 may determine a reference value. A reference value may be used to select a specific ROI from the one or more ROIs of the image for rendering and/or displaying on a screen. The reference value may be determined according to a user input. In some embodiments, the reference value determination unit 2420 may determine the reference value based on the user input. For example, the user may need or desire to observe an ROI such as the heart of a patient, and the user may know the stencil value of pixels in the ROI of the heart, for example, 1, then the user may input the reference value of 1. In some embodiments, each of the stencil values of the image may correspond to a marker such as a keyword. For example, the stencil value of pixels of the heart may be 1, and may correspond to a keyword "heart." When the user needs or desires to observe the heart, the user may input the word "heart," instead of memorizing and/or inputting the stencil value of the heart, and the reference value determination unit 2420 may determine the reference value as 1.

In some embodiments, the reference value determination unit 2420 may determine the reference value based on one or more voxels selected by a user. For example, the user may need or desire to observe an ROI such as the heart of a patient, and the user does not know the stencil value of voxels in the ROI of the heart. The user may select a voxel of the heart of the image displayed on a screen, and the reference value determination unit 2420 may determine the stencil value of the selected pixel as the reference value. In some embodiments, the user may select the voxel using a mouse. In some embodiments, the screen may include a touch screen and the user may select the voxel directly by touching the voxel on the touch screen.

In some embodiments, the user may input one or more reference values, or the user may select one or more voxels in different ROIs. The reference value determination unit 2420 may determine one or more reference values according to the user input or the selected one or more voxels. For example, the reference value determination unit 2420 may determine a first stencil value of a first voxel of the one or more voxels as a first reference value, and determine a second stencil value of a second voxel of the one or more voxels as a second reference value, or the like.

In some embodiments, the user may select a region in the image displayed on a screen, and the reference value determination unit 2420 may determine one or more reference values according to voxels in the selected region of the image. For example, the selected region may include one or more voxels having different stencil values, and the reference value determination unit 2420 may determine a first stencil value of a first voxel of the one or more voxels as a first reference value, and determine a second stencil value of a second voxel of the one or more voxels as a second reference value, or the like.

In 2603, the comparison unit 2430 may determine an ROI based on the reference value and the stencil values of voxels of the image. The comparison unit 2430 may compare the stencil values of voxels of the image with the reference value, and determine a first ROI including voxels whose stencil values satisfy a condition, e.g., being equal to the reference value. In some embodiments, for each reference value of one or more reference values, the comparison unit 2430 may compare the stencil value of each voxel of the image with the reference value, and determine one or more ROIs corresponding to the one or more reference values.

In 2604, the comparison unit 2430 may further determine an updated ROI based on a reference depth value and the depth values of voxels of the image. In some embodiments, the reference depth value may be set by the user or by the system. In some embodiments, the user or the system may set one or more reference depth values. In some embodiments, a reference depth value may correspond to a position, such as a coordinate, of the plane on which the 3D image is projected. In some embodiments, for each voxel of the ROI determined in 2603, i.e., the voxels whose stencil values are equal to the reference value, the comparison unit 2430 may further compare the reference depth value and the depth value of the voxel. In some embodiments, the comparison unit 2430 may further compare the reference depth value and the depth values of one or more voxels of the ROI, instead of all voxels of the ROI. The comparison unit 2430 may determine the updated ROI including voxels whose depth values satisfy a condition, e.g., being equal to the reference depth value.

In 2605, the rendering method determination unit 2440 may further determine a rendering method for the updated ROI from various rendering methods. Exemplary rendering methods may include volume rendering, MIP (Maximum Intensity Projection) rendering, Minimum Intensity Projection rendering, Average rendering, Multi-Planner Reformation rendering, Shaded Surface rendering, Digital Reconstruction Radiography rendering, the like, or any combination thereof. The rendering may also differ in some aspects of the image rendering, such as color rendering, depth rendering, diaphaneity rendering, alpha rendering, the like, or any combination thereof. The selection of a rendering method may be performed manually or semi-manually based at least in part on a user input or automatically by the system. For example, the user may specify MIP rendering for rendering the updated ROI of the image. In some embodiments, the rendering method determination unit 2440 may, based on a user input or automatically, determine the rendering method for the determined updated ROI, and determine an alternative rendering method for other parts (e.g., other ROIs or a region other than an ROI) of the image. For example, the rendering method determination unit 2440 may determine to render the determined updated ROI using a first color, such as red, and to render other parts of the image using a second color other than the first color, such as grey. In some embodiments, the rendering method determination unit 2440 may determine that such other parts other than an ROI of the image not be rendered and/or displayed.

In some embodiments, the comparison unit 2430 may determine multiple ROIs in 2603, and determine multiple updated ROIs in 2604, and the rendering method determination unit 2440 may determine a rendering method for each of the multiple updated ROIs. In some embodiments, the rendering methods of at least two of the multiple updated ROIs may be different or the same. For example, the rendering method determination unit 2440 may determine to render a first updated ROI of the multiple updated ROIs using a first color, such as red, to render a second updated ROI of the multiple updated ROIs using a second color, such as blue, and to render the remaining parts of the image using a third color other than the first and the second colors, such as grey. In some embodiments, the rendering method determination unit 2440 may determine that the remaining parts of the image not be rendered and/or displayed. In some embodiments, the user may determine the rendering method for a determined updated ROI. For example, the user may determine a first color for the determined updated ROI, and determine a second color for other parts of the image.

In 2606, the rendering engine 340 may render an updated ROI of the image according to the selected rendering method. The rendering engine 340 may further perform post processing to the updated ROI of the image or the other parts of the image. The post processing may include displaying, operating on the image from users, operating on the image from another module in the image processing system, the like, or any combination thereof. The displaying processing may include sub-screen displaying, contrast displaying, amplification displaying, the like, or any combination thereof. The operation on the image may include cutting, magnifying, window adjusting, rotating, processing batch, or the like, or any combination thereof. The operation on the image from another module may include generating an image mosaic, 3-D cutting, volume rendering, and so on.

In some embodiments, the post processing may include adjust a sampling rate of the image, and update the rendering method based on the sampling rate. Description of the post processing may be found elsewhere in the present application, e.g., FIGS. 13-15 and the description thereof.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a storing operation) may be added elsewhere in the process 2600. In the storing operation, the units of the ROI processing engine 320 may store information and/or data associated with the image, the updated ROI, and the rendering method in the storage device described elsewhere in the present disclosure. In some embodiments, operations 2603 and 2604 may be combined.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±1%, ±5%, ±10%, or ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A system for image rendering, comprising:
a storage device including a set of instructions; and
at least one processor in communication with the storage device, wherein when executing the set of instructions, the at least one processor is directed to cause the system to perform operations including:
obtaining image data of an image, wherein the image includes one or more regions of interest (ROIs), each pixel or voxel of the one or more ROIs having a stencil value, and stencil values of pixels or voxels in a same ROI of the one or more ROIs of the image are the same, wherein the one or more ROIs of the image are divided by the at least one processor according to a method comprising: obtaining a cutting region, wherein the cutting region is a region on a projection plane, and during each of one or more iterations:
dividing the image data or intermediate data from a previous iteration to several sub-image data based on an Octree Split-and-Merge algorithm;
for each sub-image data of the several sub-image data:
generating a projection region of the sub-image data in the projection plane;
judging a relationship between the projection region of the sub-image data and the cutting region, wherein the relationship between the projection region and the cutting region includes the projection region partially overlapping the cutting region, the projection region being contained in the cutting region, or the projection region being completely outside the cutting region;
on occurrence that the projection region partially overlaps the cutting region, determining whether the current sub-image data is a leaf node:
in response to determining that the current sub-image data is not a leaf node, determining the sub-image data as an intermediate data to be used in a next iteration; and
in response to determining that the current sub-image data is a leaf node, for each voxel in the current sub-image data, judging a relationship between a projection point of the voxel in the current sub-image data and the cutting region, and marking the voxel whose projection point is completely outside the cutting region as a ROI of the one or more ROIs; and
on occurrence that the projection region does not overlap the cutting region, marking the sub-image data whose projection region is completely outside the cutting region as the ROI of the one or more ROIs;
determining a first reference value;
for each pixel or voxel of the image, comparing the stencil value of the pixel or voxel with the first reference value;
determining a first rendering method for a first ROI including pixels or voxels whose stencil values are equal to the first reference value; and
rendering the first ROI of the image using the first rendering method.

2. The system of claim 1, wherein the at least one processor is directed to cause the system further to perform the operations including:
determining a second reference value;
for each pixel or voxel of the image, comparing the stencil value of the pixel or voxel with the second reference value;
determining a second rendering method for a second ROI including pixels or voxels whose stencil values are equal to the second reference value; and
rendering the second ROI of the image using the second rendering method.

3. The system of claim 2, wherein the first rendering method and the second rendering method specify different colors in the image for display.

4. The system of claim 2, wherein to determine the first reference value and the second reference value, the at least one processor is directed to cause the system further to perform the operations including:
determining a region of the image according to a user input;
identifying, in the region, a plurality of pixels each of whose stencil value is a first stencil value or a second stencil value;
designating the first stencil value as the first reference value; and
designating the second stencil value as the second reference value.

5. The system of claim 1, wherein to determine the first reference value, the at least one processor is directed to cause the system further to perform the operations including:
obtaining the first reference value according to a user input.

6. The system of claim 1, wherein to determine the first reference value, the at least one processor is directed to cause the system further to perform the operations including:
identifying a pixel according to a user input; and
designating the stencil value of the identified pixel as the first reference value.

7. The system of claim 1, wherein the at least one processor is directed to cause the system further to perform the operations including:
assigning a stencil value to each pixel in the ROI of the image.

8. The system of claim 1, wherein the first rendering method includes at least one of: volume rendering, MIP (Maximum Intensity Projection) rendering, Minimum Intensity Projection rendering, Average rendering, Multi-Planner Reformation rendering, Shaded Surface rendering, or Digital Reconstruction Radiography rendering.

9. The system of claim 1, wherein the at least one processor is directed to cause the system further to perform the operations including:
evaluating characteristic parameters of the image during the rendering and/or when the image is displayed;

determining a sampling rate related to the characteristic parameters according to relationship between the characteristic parameters and the sampling rate;
comparing the sampling rate with a threshold; and
replacing the first rendering method with an updated rendering method in response to determining that the sampling rate exceeds the threshold.

10. The method according to claim 9, wherein the characteristic parameters comprise one or more of a level of detail (LOD) of a screen image, a scaling factor between the screen image and the image, a ratio of visible region of the screen image and the screen image.

11. A method implemented on at least one machine each of which has at least one processor and a storage device, comprising:
obtaining image data of an image, wherein the image includes one or more regions of interest (ROIs), each pixel or voxel of the one or more ROIs having a stencil value, and stencil values of pixels or voxels in a same ROI of the one or more ROIs of the image are the same, wherein the one or more ROIs of the image are divided by the at least one processor according to a method comprising: obtaining a cutting region, wherein the cutting region is a region on a projection plane, and during each of one or more iterations:
  dividing the image data or intermediate data from a previous iteration to several sub-image data based on an Octree Split-and-Merge algorithm;
  for each sub-image data of the several sub-image data:
    generating a projection region of the sub-image data in the projection plane;
  judging a relationship between the projection region of the sub-image data and the cutting region, wherein the relationship between the projection region and the cutting region includes the projection region partially overlapping the cutting region, the projection region being contained in the cutting region, or the projection region being completely outside the cutting region;
  on occurrence that the projection region partially overlaps the cutting region, determining whether the current sub-image data is a leaf node:
    in response to determining that the current sub-image data is not a leaf node, determining the sub-image data as an intermediate data to be used in a next iteration; and
    in response to determining that the current sub-image data is a leaf node, for each voxel in the current sub-image data, judging a relationship between a projection point of the voxel in the current sub-image data and the cutting region, and marking the voxel whose projection point is completely outside the cutting region as a ROI of the one or more ROIs; and
  on occurrence that the projection region does not overlap the cutting region, marking the sub-image data whose projection region is completely outside the cutting region as the ROI of the one or more ROIs;
determining a first reference value;
for each pixel or voxel of the image, comparing the stencil value of the pixel or voxel with the first reference value;
determining a first rendering method for a first ROI including pixels or voxels whose stencil values are equal to the first reference value; and
rendering the first ROI of the image using the first rendering method.

12. The method of claim 11, further comprising:
determining a second reference value;
for each pixel or voxel of the image, comparing the stencil value of the pixel or voxel with the second reference value;
determining a second rendering method for a second ROI including pixels or voxels whose stencil values are equal to the second reference value; and
rendering the second ROI of the image using the second rendering method.

13. The method of claim 12, wherein the first rendering method and the second rendering method specify different colors in the image for display.

14. The method of claim 12, wherein the determining the first reference value and the second reference value comprises:
determining a region of the image according to a user input;
identifying, in the region, a plurality of pixels each of whose stencil value is a first stencil value or a second stencil value;
designating the first stencil value as the first reference value; and
designating the second stencil value as the second reference value.

15. The method of claim 11, wherein the determining the first reference value further comprises: obtaining the first reference value according to a user input.

16. The method of claim 11, wherein the determining the first reference value further comprises:
identifying a pixel according to a user input; and
designating the stencil value of the identified pixel as the first reference value.

17. The method of claim 11, wherein the first rendering method includes at least one of: volume rendering, MIP (Maximum Intensity Projection) rendering, Minimum Intensity Projection rendering, Average rendering, Multi-Planner Reformation rendering, Shaded Surface rendering, or Digital Reconstruction Radiography rendering.

18. A non-transitory computer-readable medium storing instructions, the instructions, when executed by a computing device, causing the computing device to implement a method, the computing device including at least one processor, the method comprising:
obtaining image data of an image, wherein the image includes one or more regions of interest (ROIs), each pixel or voxel of the one or more ROIs having a stencil value, and stencil values of pixels or voxels in a same ROI of the one or more ROIs of the image are the same, wherein the one or more ROIs of the image are divided by the at least one processor according to a method comprising: obtaining a cutting region, wherein the cutting region is a region on a projection plane, and during each of one or more iterations:
  dividing the image data or intermediate data from a previous iteration to several sub-image data based on an Octree Split-and-Merge algorithm;
  for each sub-image data of the several sub-image data:
    generating a projection region of the sub-image data in the projection plane;
  judging a relationship between the projection region of the sub-image data and the cutting region, wherein the relationship between the projection region and the cutting region includes the projection region partially overlapping the cutting region, the projection region being contained in the cutting region, or the projection region being completely outside the cutting region;

on occurrence that the projection region partially overlaps the cutting region, determining whether the current sub-image data is a leaf node:
- in response to determining that the current sub-image data is not a leaf node, determining the sub-image data as an intermediate data to be used in a next iteration; and
- in response to determining that the current sub-image data is a leaf node, for each voxel in the current sub-image data, judging a relationship between a projection point of the voxel in the current sub-image data and the cutting region, and marking the voxel whose projection point is completely outside the cutting region as a ROI of the one or more ROIs; and on occurrence that the projection region does not overlap the cutting region, marking the sub-image data whose projection region is completely outside the cutting region as the ROI of the one or more ROIs;

determining a first reference value;

for each pixel or voxel of the image, comparing the stencil value of the pixel or voxel with the first reference value;

determining a first rendering method for a first ROI including pixels or voxels whose stencil values are equal to the first reference value; and rendering the first ROI of the image using the first rendering method.

19. The method according to claim 9, wherein the relationship between the characteristic parameters and the sampling rate includes an exponential function or a Poisson function.

\* \* \* \* \*